United States Patent

Nakatani et al.

[11] Patent Number: 5,995,241
[45] Date of Patent: Nov. 30, 1999

[54] DATA PROCESSOR

[75] Inventors: Munehiro Nakatani, Toyohashi; Hiroyuki Suzuki; Kazuomi Sakatani, both of Toyokawa, all of Japan

[73] Assignee: Minolta Co., Ltd., Osaka, Japan

[21] Appl. No.: 08/591,715

[22] Filed: Jan. 25, 1996

Related U.S. Application Data

[62] Division of application No. 08/267,711, Jun. 28, 1994, Pat. No. 5,517,327.

[30] Foreign Application Priority Data

Jun. 30, 1993 [JP] Japan ............................... P05-162016
Jul. 22, 1993 [JP] Japan ............................... P05-181268
Aug. 5, 1993 [JP] Japan ............................... P05-194654

[51] Int. Cl.$^6$ .............................. H04N 1/40; H04N 1/41
[52] U.S. Cl. ........................ 358/426; 358/462; 358/427; 358/432; 358/433; 382/250; 382/251; 348/384; 348/403; 348/405
[58] Field of Search .................................... 358/462, 426, 358/427, 432, 433, 448, 261.1, 261.2, 261.3; 382/176, 246, 251, 173, 232, 245, 248, 250; 348/384, 403, 405, 420

[56] References Cited

U.S. PATENT DOCUMENTS

4,903,142  2/1990  Hasebe et al. ........................... 358/457
5,101,438  3/1992  Kanda et al. .............................. 382/9

FOREIGN PATENT DOCUMENTS

469852A2  2/1992  European Pat. Off. .

OTHER PUBLICATIONS

"DCT Image Coding Using Adaptive Quantization Application to Digital Color Copiers," Kazuyuki Murata, Gazou Denshi Gakkaishi, vol. 20, No. 5 (1991) pp. 467–475.

*Primary Examiner*—Thomas D. Lee
*Attorney, Agent, or Firm*—Sidley & Austin

[57] ABSTRACT

Image data of a pixel matrix are subjected to orthogonal transformation to coefficient data, which are then quantized with a first quantization table for character image and with a second quantization table for half-tone image. Image data are discriminated as character image data or half-tone image data according to the quantization data. The quantization data corresponding to the discrimination are subjected to entropy coding. Image data can be divided into first processing blocks of m*m pixel matrices and second processing blocks of M*M pixel matrices where M>m. A second processing block includes one first processing block and adjacent pixels. Image data in first and second processing blocks are subjected to orthogonal transformation to coefficient data. Coefficient data of the second processing block indicates whether the image is a character image, a dot image, or a half-tone image, permitting selection of an appropriate quantization table. Image data of the first processing block is quantized according to the selected quantization table and quantized data are coded. In order to discriminate a dot image, two discrimination windows are provided, with the first consisting of coefficient data around the DC component and the second consisting of other data. Orthogonal transform coefficients of image data are calculated, and maximum absolute values in the windows are obtained. An image is discriminated to be a dot image if the first window maximum is larger than a prescribed threshold value and is larger than the second window maximum.

2 Claims, 29 Drawing Sheets

DCT data (1)

| 1330 | 220 | 139 | -38 | 39 | 13 | 17 | -8 |
|---|---|---|---|---|---|---|---|
| 70 | -262 | 2 | 128 | 41 | -10 | -18 | 6 |
| 168 | -126 | 111 | -18 | -54 | 37 | -13 | -4 |
| 206 | 157 | -180 | 3 | 22 | -56 | 2 | 5 |
| 150 | 98 | -111 | -5 | -48 | 2 | 10 | -28 |
| -98 | 72 | 60 | -115 | -1 | 0 | 5 | 22 |
| -16 | -61 | 4 | -47 | 26 | 21 | -1 | 4 |
| -38 | -64 | 7 | 36 | -56 | 33 | 18 | 4 |

DCT data (2)

| 1389 | -227 | 49 | -5 | 26 | 37 | 20 | 0 |
|---|---|---|---|---|---|---|---|
| 257 | 257 | -17 | -34 | -20 | -28 | -22 | 1 |
| 117 | 0 | 26 | 108 | -3 | 11 | 2 | -17 |
| 91 | 27 | -45 | -92 | -32 | 0 | 20 | 24 |
| 37 | -85 | -145 | -28 | 74 | -9 | -31 | -20 |
| -22 | -118 | 66 | 123 | 12 | -5 | 6 | 11 |
| -12 | 17 | 143 | -71 | -57 | 63 | 29 | -22 |
| -9 | 41 | 59 | -73 | -7 | -71 | -41 | 28 |

DCT data (3)

| 1351 | 311 | 304 | -146 | -105 | 101 | 17 | -52 |
|---|---|---|---|---|---|---|---|
| 40 | 52 | -26 | -123 | 4 | 98 | -18 | -49 |
| 19 | -71 | 13 | 91 | -18 | -48 | -13 | 18 |
| -22 | 41 | -22 | -26 | 9 | 25 | 2 | -16 |
| 25 | -13 | 0 | 8 | -31 | -13 | 10 | 22 |
| -62 | 31 | -7 | 19 | 19 | 4 | -20 | -23 |
| 131 | -79 | -7 | -12 | -12 | 19 | 13 | 0 |
| -88 | 49 | 5 | 27 | -9 | -16 | 5 | 0 |

DCT data (4)

| 1122 | -181 | 285 | 92 | -216 | 60 | 58 | -28 |
|---|---|---|---|---|---|---|---|
| 9 | -59 | -16 | -47 | -45 | 28 | 67 | -3 |
| 37 | -192 | 54 | 24 | 49 | -46 | 0 | -2 |
| -79 | -34 | -28 | -108 | 29 | 56 | 5 | -4 |
| -101 | 12 | -70 | 91 | -2 | -23 | -1 | 18 |
| -52 | -78 | -43 | 10 | -34 | 33 | 20 | -5 |
| 81 | 22 | 43 | -50 | 41 | 11 | -14 | 4 |
| -111 | -93 | -13 | 32 | 9 | -23 | 13 | 4 |

Fig.15

DCT data

| 5193 | 193 | 941 | 115 | 779 | 14 | −272 | −61 | −255 | 259 | 17 | 60 | 103 | −92 | −31 | −60 |
|---|---|---|---|---|---|---|---|---|---|---|---|---|---|---|---|
| 346 | −341 | −185 | 23 | −397 | 9 | 240 | −32 | 348 | −65 | −26 | −40 | −9 | 53 | −2 | 26 |
| 237 | −154 | −633 | 43 | 27 | 123 | 238 | 237 | 62 | −181 | −51 | −22 | −108 | 79 | 50 | 37 |
| 304 | 40 | −459 | 105 | 140 | −12 | −110 | −6 | −181 | 205 | 113 | 53 | 14 | −114 | −36 | −36 |
| 343 | −130 | −5 | −320 | 207 | 293 | −60 | −17 | −26 | −86 | 23 | −31 | −5 | 3 | 33 | −18 |
| 162 | 184 | 47 | 126 | −133 | −50 | −56 | −73 | 25 | 49 | −66 | 30 | −9 | −5 | −8 | 29 |
| 399 | 137 | 54 | 46 | −175 | −140 | 13 | 165 | −49 | −87 | −24 | −75 | 28 | 34 | −6 | 43 |
| 288 | 169 | 210 | 15 | −283 | −283 | 262 | −119 | 20 | 51 | −42 | −5 | 4 | −43 | −33 | −44 |
| 111 | 216 | 158 | −23 | −328 | 170 | −59 | −90 | −8 | −114 | 22 | 21 | −1 | 50 | −4 | −35 |
| 33 | −131 | 276 | −7 | −46 | 79 | −128 | −78 | 67 | −50 | 8 | 50 | −41 | −24 | −2 | −36 |
| −5 | −55 | 79 | −2 | 178 | −49 | −247 | −23 | 26 | −85 | 34 | 12 | 12 | 52 | 28 | 49 |
| −320 | −55 | 188 | −30 | 127 | −78 | −154 | 86 | −67 | 158 | −60 | −50 | 48 | −53 | 6 | 27 |
| 184 | 8 | −180 | −170 | 183 | −196 | 62 | −101 | −1 | 122 | −33 | 48 | 26 | −17 | 20 | −7 |
| −201 | −49 | −29 | −21 | 77 | −57 | 82 | 10 | −42 | −7 | 28 | 7 | −3 | 2 | 20 | −13 |
| 151 | −35 | −248 | 6 | 75 | −118 | 115 | −50 | −65 | −24 | 98 | 45 | −42 | 56 | −18 | 9 |
| −209 | −2 | 72 | −75 | 38 | 25 | 69 | −6 | −65 | −85 | 108 | −27 | 7 | 66 | −45 | 19 |

Fig.16

DCT data (1)
1301

DCT data (2)
1306

DCT data (3)
1296

DCT data (4)
1305

Fig.17

DCT data

Fig.19

DCT data (1)
1295

| 0 | 1 | −6 | −8 | −9 | 8 | 2 |
| --- | --- | --- | --- | --- | --- | --- |
| 0 | 0 | −1 | 0 | 3 | 0 | −1 |
| −3 | −2 | −4 | −5 | −18 | 16 | 4 |
| 0 | 0 | 3 | 2 | 5 | 0 | −3 |
| −6 | −7 | −13 | −12 | −42 | 44 | 13 |
| −2 | −6 | 0 | −12 | 2 | 22 | 4 |
| −1 | 3 | 5 | 4 | 18 | −15 | −5 |
| 0 | 1 | 0 | 0 | 0 | 0 | 0 |

DCT data (2)
1601

| −307 | 89 | 60 | −62 | −7 | 25 | −17 |
| --- | --- | --- | --- | --- | --- | --- |
| 0 | 2 | −3 | −2 | 0 | 0 | 0 |
| −3 | 1 | 3 | −3 | −17 | −7 | 7 |
| 0 | 0 | −3 | −3 | 0 | 0 | 1 |
| −3 | 0 | 10 | −14 | −51 | −21 | 24 |
| 7 | 0 | −11 | −9 | 6 | 6 | −5 |
| −4 | 0 | −3 | 5 | 17 | 7 | −9 |
| 2 | 0 | 0 | 1 | 0 | −1 | 0 |

DCT data (3)
1301

| 2 | 0 | −5 | 10 | −6 | −4 | −25 |
| --- | --- | --- | --- | --- | --- | --- |
| 3 | 1 | 1 | 2 | −4 | −1 | −1 |
| 2 | 2 | 4 | 17 | −10 | −6 | −4 |
| 0 | 0 | 1 | 2 | −7 | −1 | −4 |
| 10 | 6 | 10 | 47 | −18 | −17 | −7 |
| −4 | 2 | 6 | −41 | 2 | 11 | 17 |
| −6 | −4 | −5 | −17 | 11 | 6 | 6 |
| −3 | 0 | 0 | −1 | 2 | 1 | 2 |

DCT data (4)
1604

| −308 | 86 | 59 | −58 | 8 | 34 | −25 |
| --- | --- | --- | --- | --- | --- | --- |
| 1 | 0 | −1 | 0 | 4 | 3 | −1 |
| −1 | 0 | −2 | 2 | 11 | 5 | −4 |
| 0 | 2 | −3 | 0 | 9 | 5 | −4 |
| −6 | 0 | −12 | 1 | 27 | 16 | −7 |
| 17 | −2 | 30 | 12 | −39 | −24 | 17 |
| 1 | 0 | 2 | −3 | −13 | −6 | 6 |
| 0 | −1 | 0 | 0 | −1 | 0 | 2 |

Fig.20

DCT data

| 5802 | −791 | 619 | −391 | 172 | −6 | −133 | 146 | −120 | 63 | 1 | −40 | 58 | −60 | 43 | −20 |
|---|---|---|---|---|---|---|---|---|---|---|---|---|---|---|---|
| −8 | 3 | 1 | −3 | −3 | −8 | 0 | −2 | −14 | −9 | 17 | 7 | −1 | 6 | −5 | 4 |
| −4 | −2 | 0 | −4 | 0 | −5 | 0 | 1 | −1 | 3 | 8 | −1 | −3 | 3 | −2 | 0 |
| −1 | 0 | −3 | −4 | −5 | 5 | −5 | −3 | −18 | −8 | 20 | 3 | 0 | 8 | −2 | 4 |
| 0 | 1 | −1 | 0 | 4 | 1 | −2 | 0 | −3 | 1 | 12 | −1 | −3 | 2 | −3 | 0 |
| −6 | −2 | −1 | −5 | −3 | −3 | −4 | 6 | −23 | −8 | 24 | 8 | 0 | 6 | −3 | 5 |
| −4 | −2 | 2 | 1 | 0 | 4 | 0 | 2 | 0 | 4 | 18 | −3 | −6 | 7 | −8 | 0 |
| −1 | −6 | −4 | −7 | −6 | 6 | −6 | −6 | −31 | −14 | 34 | 7 | −1 | 14 | −5 | 6 |
| 5 | 2 | 0 | 0 | 3 | −1 | 0 | 5 | −7 | 16 | 49 | −6 | −9 | 13 | −16 | 9 |
| 0 | −37 | −17 | −19 | −37 | −14 | −56 | −27 | −114 | −95 | 161 | 63 | −7 | 60 | −31 | 26 |
| −20 | 12 | −4 | −2 | 17 | −21 | 22 | −26 | 22 | 111 | −26 | −8 | 23 | −28 | 26 | −14 |
| 4 | 7 | 7 | 7 | 7 | 10 | 10 | 12 | 40 | 11 | −48 | −10 | 1 | −18 | 10 | −7 |
| −10 | −5 | 1 | 0 | 0 | 0 | 0 | −2 | 3 | 0 | −8 | 1 | 2 | 0 | 3 | −2 |
| −4 | 2 | 6 | 1 | 2 | 1 | 4 | 2 | 12 | 7 | −14 | −3 | 0 | −5 | 3 | −3 |
| 7 | 2 | −2 | −1 | 1 | 0 | 0 | 0 | 3 | 0 | −4 | 1 | −1 | −1 | 3 | −1 |
| 2 | −2 | 0 | 3 | 0 | 1 | 1 | 1 | 3 | −2 | −2 | 2 | −1 | 0 | 0 | 2 |

Fig.21

DCT data (1)

| 879 | -18 | 9 | -1 | 0 | 2 | 0 | 21 |
|---|---|---|---|---|---|---|---|
| 99 | 10 | 14 | 6 | 1 | 3 | -5 | 3 |
| 75 | -22 | -23 | 10 | 9 | 7 | 3 | -10 |
| 3 | -35 | -11 | 16 | -31 | -24 | -13 | 9 |
| -11 | 11 | 33 | 20 | 2 | -3 | -3 | -9 |
| -23 | -1 | 13 | -16 | 33 | 27 | 6 | -5 |
| -15 | -17 | -9 | -27 | 4 | -4 | 7 | 6 |
| 6 | 16 | 16 | 0 | -13 | -32 | -1 | 3 |

DCT data (2)

| 861 | 154 | -117 | 32 | 22 | -7 | -10 | 13 |
|---|---|---|---|---|---|---|---|
| -71 | 154 | -81 | -6 | 43 | -23 | -7 | 6 |
| 29 | 9 | 0 | -47 | 34 | -18 | -13 | 18 |
| 17 | 15 | 13 | -16 | -10 | 15 | -16 | 23 |
| 2 | 14 | 22 | 0 | 0 | 8 | -12 | 6 |
| -13 | 1 | 17 | -8 | 3 | -7 | -1 | -22 |
| -8 | -8 | 0 | 17 | 17 | 11 | 6 | 4 |
| -1 | -10 | -3 | 19 | 25 | 32 | 19 | 28 |

DCT data (3)

| 754 | -36 | -5 | 8 | -7 | 2 | -3 | -2 |
|---|---|---|---|---|---|---|---|
| 24 | -25 | 12 | 6 | 12 | -4 | -5 | 3 |
| 4 | -9 | -8 | 20 | -9 | 1 | -8 | 13 |
| -3 | 14 | -13 | 10 | 6 | -12 | -3 | -6 |
| 8 | -9 | 8 | 2 | 5 | -6 | -2 | -9 |
| -9 | -11 | -4 | 4 | -1 | 1 | -2 | 6 |
| 15 | 7 | -16 | 6 | 1 | -6 | 5 | -7 |
| 0 | -8 | -1 | 0 | 1 | -2 | -1 | -1 |

DCT data (4)

| 856 | -77 | 40 | 21 | -26 | -12 | -10 | 3 |
|---|---|---|---|---|---|---|---|
| 66 | 14 | -29 | 0 | 30 | 30 | 4 | 17 |
| -2 | -23 | 0 | -8 | -35 | -5 | 2 | 10 |
| 14 | 11 | 12 | 23 | 2 | 2 | -7 | 10 |
| -12 | -11 | -7 | 9 | 12 | 6 | -20 | -34 |
| 19 | 2 | -6 | 10 | 4 | -3 | 16 | 34 |
| 4 | 6 | 4 | -11 | -11 | 8 | 1 | -15 |
| 9 | 2 | 5 | 22 | 10 | -11 | -21 | -4 |

Fig.22

DCT data

```
 3351   -70  -133    78   -72    69   -47    36   -10   -26    26     6   -24    26     2    30
  160   249  -268   282  -164   107   -14   -52    79   -25   -11     8    -2    12     7    47
  261  -104   100   -49    18     6   -18     3   -38    61   -23   -13    16    10   -25     0
  -62    95   -94    44   -28    30    34   -66   100   -22    12     8    -9     6   -33     0
  102    30   -17   -64   -32   -14    87   -23    -1     7    32   -23   -16    35   -25   -10
  106     4   -41   -16   -18   -46    18   -13    33   -44   -13    19   -21    12   -27    -2
   80   -15   -54   -33     2    -9    45   -50   -50     1   -25   -11   -19    20     2    18
    9   -24   -31     7    36     1    27    47   -51   -29   -49     3   -28     5   -40    65
   -4     5    -1    12    56    36    13    14    19   -10   -25    27   -39    -7     9   -46
  -13    -5     0    39    44   -25    12     6    25    23    41     3    27     0   -27    20
    6    -3    11    12    41   -36     0    -2    33    38    30    23    -8   -10    45   -72
  -72   -26   -25   -33     2    13   -44   -10    34    22    19    -7     6     7    -2    22
  -24   -13    -7   -21   -20   -28   -26    -2    11     2   -31    10    20    -5     9    -9
  -18    -3    11    -5    11    30   -62   -29    31   -33   -27     4     6    13   -12    27
   -4    11    37    17     9    22     3   -31    -1     0   -74   -11    41   -22   -19    43
  -13    23     8    -7    13    34   -18    15    10   -37   -50     3   -11    -7    -8    15
```

DATA PROCESSOR

This application is a division of application Ser. No. 08/267,711, filed Jun. 28, 1994, now U.S. Pat. No. 5,517,327.

BACKGROUND OF THE INVENTION

1. Field of the Invention

The present invention relates to a data processor for data compression of image data.

2. Description of the Prior Art

An international standard for color image coding by a Joint Photographic Experts Group (JPEG) is a known coding technique of image data. In the color image coding, image data is divided into processing blocks each of a prescribed size of pixel matrix (normally 8*8 pixel matrix) and image data in a processing block is subjected to two dimensional pixel discrete cosine transformation (DCT). Then, weights are given to the DCT data, and the DCT data is subjected to nonlinear quantization and entropy coding. The decoding of the image data is performed with processing reverse to the above-mentioned processing. However, if this color image coding is applied to an image including characters and half-tone images, a character image is liable to be deteriorated and a half-tone image is liable to have a lower compression ratio. In order to solve the problems, it is proposed first to discriminate if an image to be coded is a character image or a half-tone image and second to select a quantization table used for the quantization according to the discrimination.

However, this method has a problem that the discrimination takes a long time. It is also a problem that if the discrimination is erroneous, an erroneous quantization table is selected and this causes block distortion, mosquito noises and the like in an image. The precision of discrimination may be enhanced by increasing a size of the processing block. However, if the size of the processing block is increased, an amount of data to be processed after the quantization process becomes very large, and a processing speed of data decreases. Another problem on the discrimination of image is that an erroneous discrimination is liable to occur especially on a dot image wherein an image is expressed as an assembly of minute dots.

SUMMARY OF THE INVENTION

An object of the present invention is to provide a coding apparatus which can performs discrimination of a character image and a half-tone image more precisely and efficiently in a short time.

Another object of the present invention is to provide a coding apparatus which can performs discrimination of a character image, a dot image and a half-tone image more precisely and efficiently in a short time.

A different object of the present invention is to provide a coding apparatus which can discriminate a dot image more precisely.

In one aspect of the present invention, in order to perform coding efficiently, image data of a prescribed size of pixel matrix is subjected to orthogonal transformation to be transformed to coefficient data. A first quantization table for character image and a second quantization table for half-tone image are provided. The coefficient data is quantized with the first quantization table and with the second quantization table. Then, the quantized data are used to discriminate a character image data and a half-tone image. Then, quantized data in correspondence to the discrimination result is selected or subjected to entropy coding.

In a further aspect of the invention, in order to discriminate a kind of image in a processing block fast and correctly, image data are divided into first processing blocks of m*m pixel matrices and second processing blocks of M*M pixel matrices wherein M>m. A second processing block includes one of first processing blocks and adjacent pixels around it. For example, m=8 and M=16. Image data in a first processing block and image data in a second processing block including the first processing block are subjected to orthogonal transform to send coefficient data, respectively. It is discriminated according to the coefficient data of the second processing block if the image is a character image, a dot image or a half-tone image to select an appropriate quantization table. Then, image data of the first processing block is quantized according to the selected quantization table and quantized data are coded. Adjacent pixels around a processing block may be taken into account for image discrimination in a different way. For example, data of adjacent block may be added to data in a processing block with weights and image discrimination is performed with the weighted sum.

In a different aspect of the invention, in order to discriminate a dot image in a processing block, two discrimination windows are provided. A first of the windows consists of coefficient data around the DC component and a second consists of the other data. First, orthogonal transform coefficients of image data in a processing block are calculated. The image is discriminated to be a dot image if a maximum of absolute values of the first window is larger than that of the second and the former is larger than a prescribed threshold value.

An advantage of the present invention is that discrimination of a character image and a half-tone image can be performed precisely, by using two quantization tables for character image and for half-tone image and efficiently by using not data of say 8 bits before quantization, but data of say a few bits after quantization.

Another advantage of the present invention is that image can be discriminated more precisely by taking into account pixels around a processing block to be coded.

A different advantage of the present invention is that a dot image can be discriminated more precisely by using appropriate discrimination windows.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 3A and 3B are diagrams of a first quantization table and a second quantization table, respectively;

FIG. 14 is a diagram of four 8*8 DCT matrices of a second example of a character image;

FIG. 15 is a diagram of a 16*16 DCT matrices of the character image;

FIG. 16 is a diagram of four 8*8 DCT matrices of a second example of a dot image;

FIG. 17 is a diagram of a 16*16 DCT matrices of the dot image;

FIG. 19 is a diagram of four 8*8 DCT matrices of the dot image;

FIG. 20 is a diagram of a 16*16 DCT matrices of the dot image;

FIG. 21 is a diagram of four 8*8 DCT matrices of a half-tone image;

FIG. 22 is a diagram of a 16*16 DCT matrices of the half-tone image;

DETAILED DESCRIPTION OF THE PREFERRED EMBODIMENTS

Figure 1:
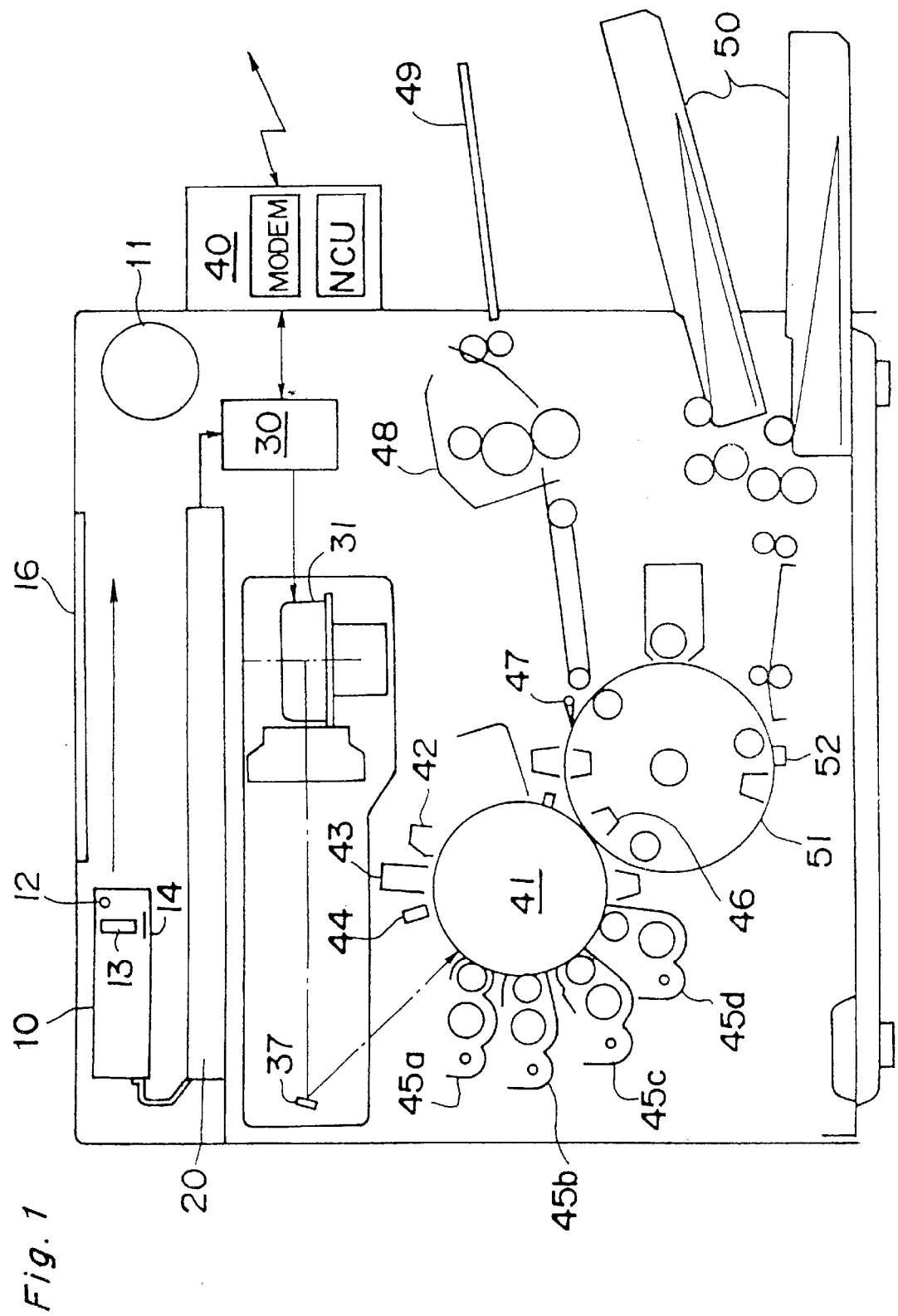
FIG. 1 is a schematic sectional view of a digital color copying machine.

Referring now to the drawings, wherein like reference characters designate like or corresponding parts throughout the views, FIG. 1 shows a digital color copying machine which also serves as a facsimile apparatus, wherein image data of a document placed on a platen is read with an image reader and an image is printed on a paper with an electrophotographic process according the read image data.

The scanner comprises an exposure lamp, a rod lens array 13 and a color image sensor 14. When a copying operation is started, the scanner is driven by a motor 11 to read image data of the document. A signal processor 20 processes the image data and then supplies them to a coding unit 30. The coding unit 30 sends the image data to a print head 31. On the other hand, it also performs coding of the image data and the coded data may be transmitted to another facsimile apparatus via a facsimile transmission section 40 comprising a modulation and demodulation unit (MODEM) and a network control unit (NCU).

A laser diode in the print head 31 emits a light beam according the image data received from the coding unit 30, and the light beam is guided via a reflection mirror 37 to illuminate a surface of a photoconductor drum 41. The light beam forms an electrostatic latent image on the photoconductor drum 41 which has been sensitized at a predetermined potential. A development unit 45a–45d develops the latent image with toners of either of cyan, magenta, yellow and black. A paper in a tray 50 is fed to a transfer drum 51 and its top is chucked with a chucking mechanism 52. The toners adhered to the latent image is transferred to the paper wound on the transfer drum 51. Then, the latent image is erased with a lamp 42. Toners of four colors of cyan, magenta, yellow and black are transferred successively to the paper. Then, the paper is isolated from the transfer drum 51 with a claw 47 and discharged to a tray 49.

First Embodiment

Next, discrimination of image data of a character and a half-tone image is explained. In a first embodiment, DCT data are calculated from pixel data and they are quantized with two kinds of quantization tables for character and half-tone images. Then, two kinds of quantized data are used to discriminate an image, and one of the data quantized with the quantization table in correspondence to the discrimination result is used for coding for data compression.

Figure 2:
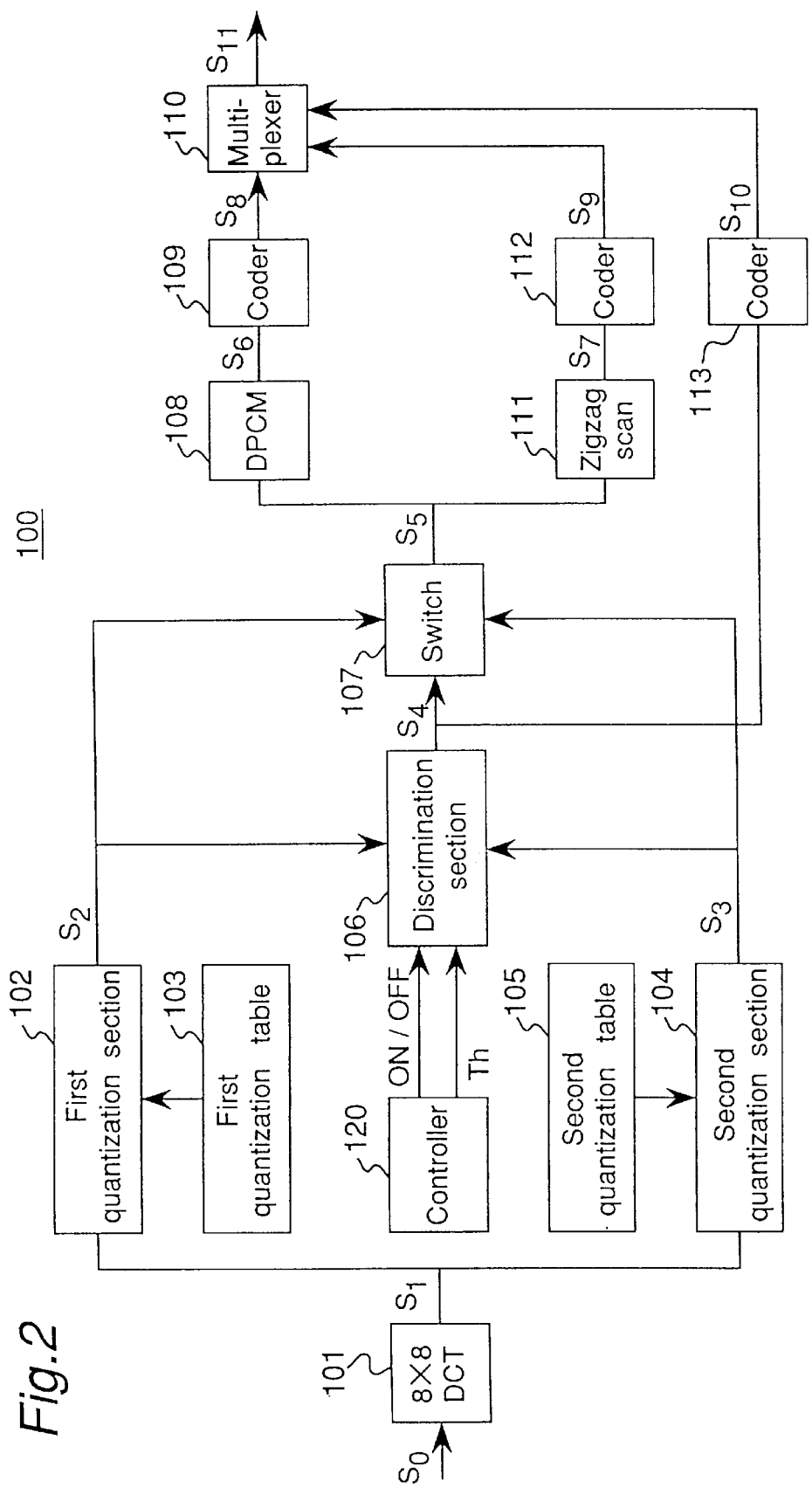
FIG. 2 is a diagram of a processing block of a coder of a first embodiment.

FIG. 2 shows a processor block 100 in the coding unit 30. A DCT (discrete cosine transform) section 101 transforms image data $S_0$ in a block of 8*8 pixel matrix to DCT coefficients $S_1$ and sends the DCT coefficients $S_1$ to first and second quantization sections 102 and 104 connected in parallel to each other. In the DCT transformation, data $P_{x,\,y}$ (x, y=0, 1, . . . , 7) of pixels in a processing matrix are transformed into DCT coefficients Su v (u, v=0, 1, . . . , 7) as follows:

$$S_{u,v} = \frac{1}{4}C_u C_v \sum_{x=0}^{7}\sum_{y=0}^{7} (P_{x,y} - L_s)\mathrm{COS}(2x+1)U\frac{\pi}{16} \cdot \mathrm{COS}(2y+1)v\frac{\pi}{16} \quad (1)$$

wherein x and y denote positions in a processing matrix, u and v denote positions in a matrix of DCT coefficients, $$c_u, c_v = 1/\sqrt{2}, \quad ; u,\, v = 0$$
$$= 0, \quad ; \text{otherwise}$$

$L_s$=128.

Figures 3A, 3B:
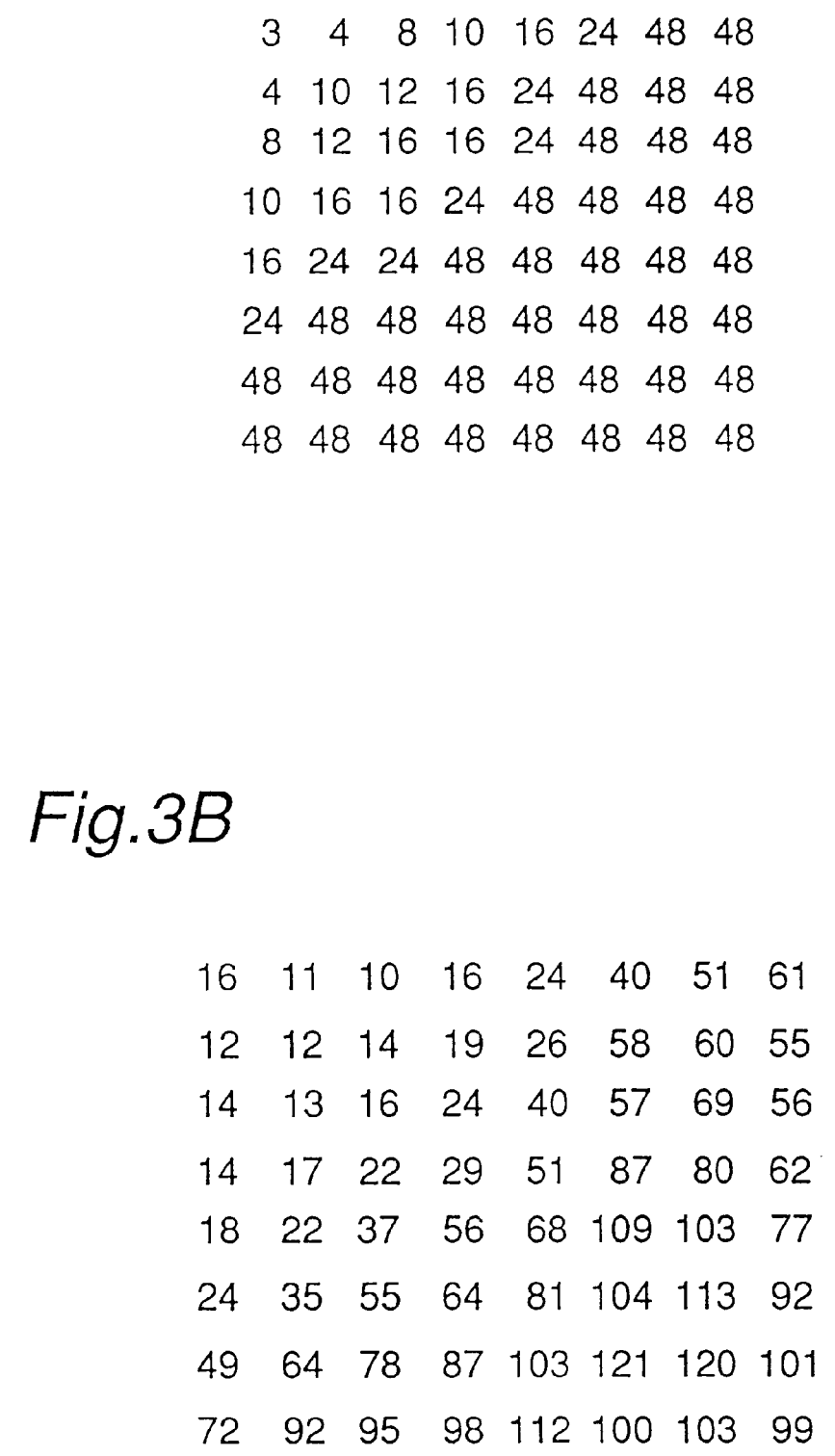

The first quantization unit 102 is connected to a first quantization table 103 which has relatively small quantization steps for decreasing quantization errors for an image having high frequency components such as a character. FIG. 3A shows an example of the first quantization table 103. The first quantization unit 102 receives the DCT coefficients and quantizes them by using the first quantization table 103. The quantized data $S_2$ are sent to a discrimination section 106 and to a switch 107.

The second quantization unit 104 is connected to a second quantization table 105 which is a standard JPEG table suitable for an image which is not needed to take high frequency components seriously. FIG. 3B shows an example of the second quantization table 105 having large quantization steps at high frequencies in order to suppress high frequency components, to increase a compression ratio and to smooth data in the decoded image. The second quantization unit 104 receives the DCT coefficients and quantizes them by using the second quantization table 105. The quantized data $S_3$ are also sent to the discrimination section 106 and to the switch 107.

Figure 4:
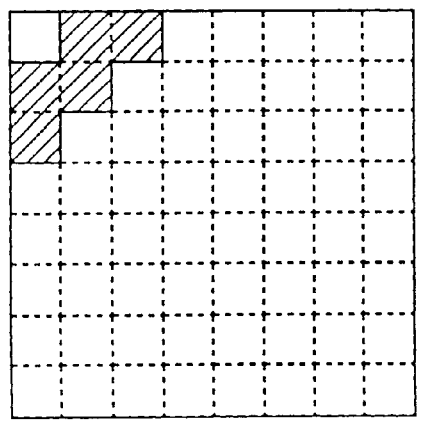
FIG. 4 is a diagram of a processing block used in the discrimination section.

In a space frequency spectrum, a picture image generally has high values at low frequencies about 2 lines/mm. FIG. 4 shows an 8*8 matrix of DCT components, wherein a top leftmost element in the matrix is a DC components. A block or window consists of hatched five AC components which correspond to low frequency components expected to be prominent for a character image. Then, there is a characteristic that the absolute values of quantized data in the block of a character image are larger than that of a half-tone image. The discrimination section 106 utilized the characteristic to discriminate a character image.

A controller 120 provides an ON signal to the discrimination section 106 when a quantized data received by the discrimination section is a data in the block shown in FIG. 4 with hatching, otherwise it sends an OFF signal to the discrimination section 106. Further, the controller 120 sends a threshold value Th to the discrimination section 106, and the threshold value Th is used for discrimination if an image in the 8*8 processing block is a character image. As described above, the discrimination section 106 receives quantized data $S_2$ and $S_3$ from the first and second quantization sections 102 and 103 and signals from the controller 120 and discriminates if an image in the processing block is a character image. Then, it sends a 1-bit discrimination signal $S_4$ to the switch 107. Details of the discrimination section 106 is explained later.

Figure 5:
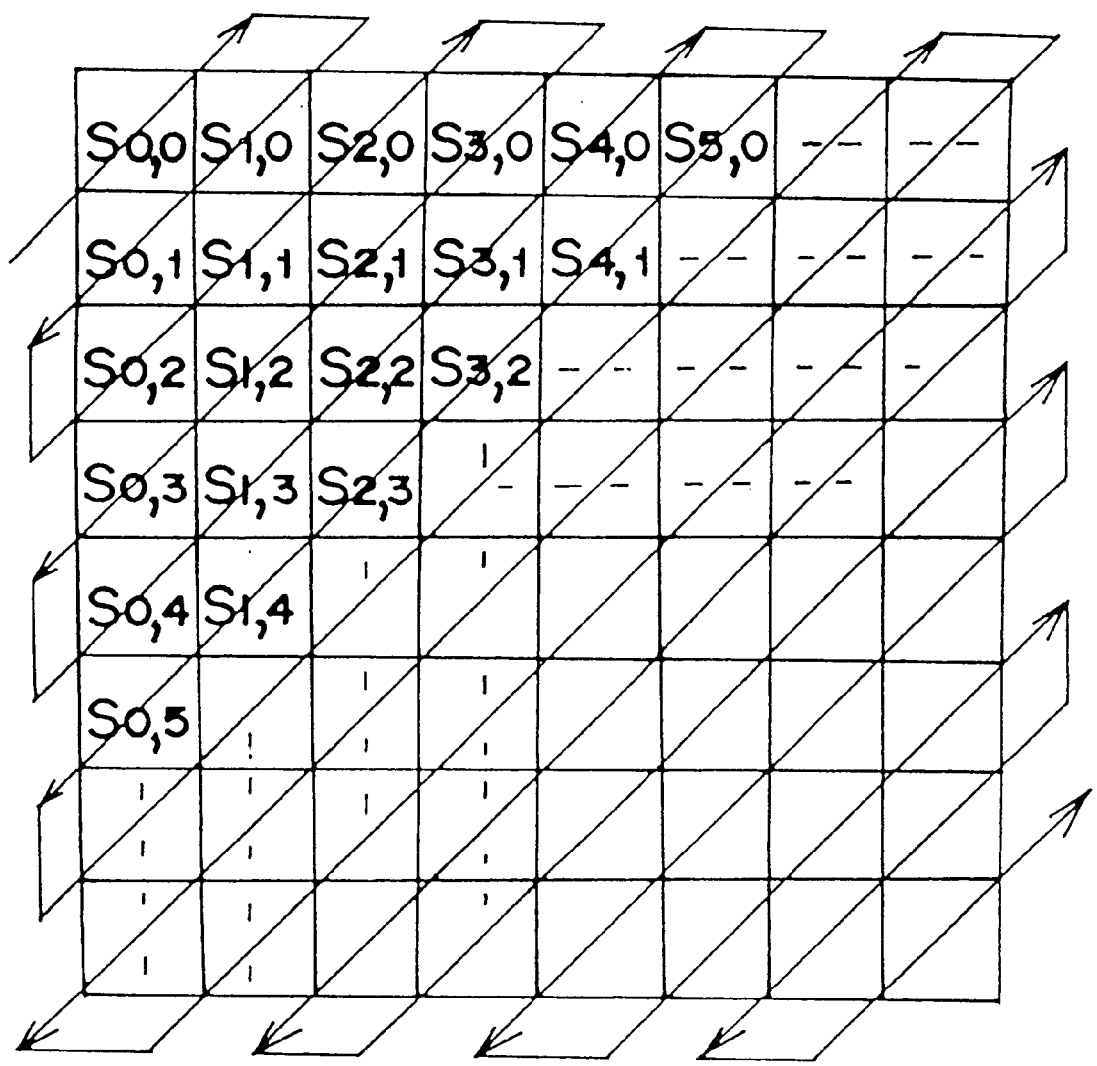
FIG. 5 is a diagram for illustrating the order of zigzag scan of AC components in a processing block.

The switch 107 selects the signal $S_2$ or $S_3$ according to the discrimination signal and sends it as a signal $S_5$ to a differential pulse-coded modulation (DPCM) section 108 and a zigzag scan section 111. The DPCM section 108 calculated a difference between the DC component of the signal $S_5$ and that of the previous processing unit, and a coder 109 processes the difference for entropy coding (Huffmann coding). On the other hand, the zigzag scan section 111 scans the AC components (u, v; u=1–8, v=1–8) of the signal $S_5$ in the order shown in FIG. 5 so as to reorder them in a one-dimensional array. In FIG. 5, the numbers from 1 to 63 shows the order in a matrix of 8*8 for the scan by the zigzag scan section 111. A coder 112 processes the reordered data for entropy coding. A coder 113 processes the 1-bit signal $S_4$ sent by the discrimination section 106 for entropy coding. A multiplexer 110 multiplexes the data $S_6$, $S_9$ and $S_{10}$ coded by the coders 109, 112, 113 and sends a multiplex data $S_{11}$ to the facsimile transmission unit 40 or the like.

Figure 6:
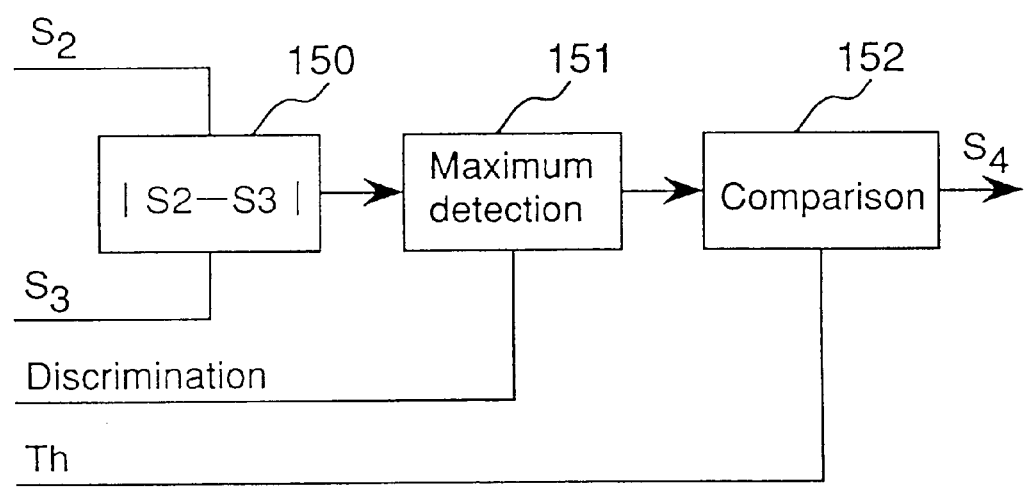
FIG. 6 is a block diagram of a coding section.

FIG. 6 shows a structure of the discrimination section 106 which performs discrimination according to the quantized data S2 and S3 of the low frequency components in a block shown with hatching in FIG. 4. The controller 120 sends a discrimination ON signal for input data of the hatched pixels to a maximum detection circuit 151 in the discrimination section 106. The controller 120 also sends a threshold level to a comparison circuit in the discrimination section 106. In the discrimination section 106, a difference circuit 150 receives quantized data $S_2$ and $S_3$ and calculates an absolute value of the difference for each component. Next, the maximum detection circuit 151 which is operated only when the discrimination ON signal is received updates a maximum value if a newly received difference data is larger than the current maximum value. Next, the comparison circuit 152 compares the maximum value with the threshold value Th. As explained above, the quantized data $S_2$ is provided by using the quantization table 103 for a character image, while the quantized data S3 is provided by using the quantization table 104 not for a character image. Then, if the comparator 152 decides that the maximum is larger than the threshold value Th, an image under discrimination is a character image. Therefore, the comparator sends "1" (character signal) of 1-bit discrimination signal $S_4$. Otherwise it sends "0" (half-tone image) of 1-bit discrimination signal $S_4$. Thus, because the discrimination section discriminates a character image according not to data (say 8 bits) before quantization, but to data (say a few bits) after quantization, a coding apparatus of the embodiment can perform coding efficiently. Therefore, the discrimination of a character image can be carried out at a fast rate.

Second Embodiment

Figure 7:
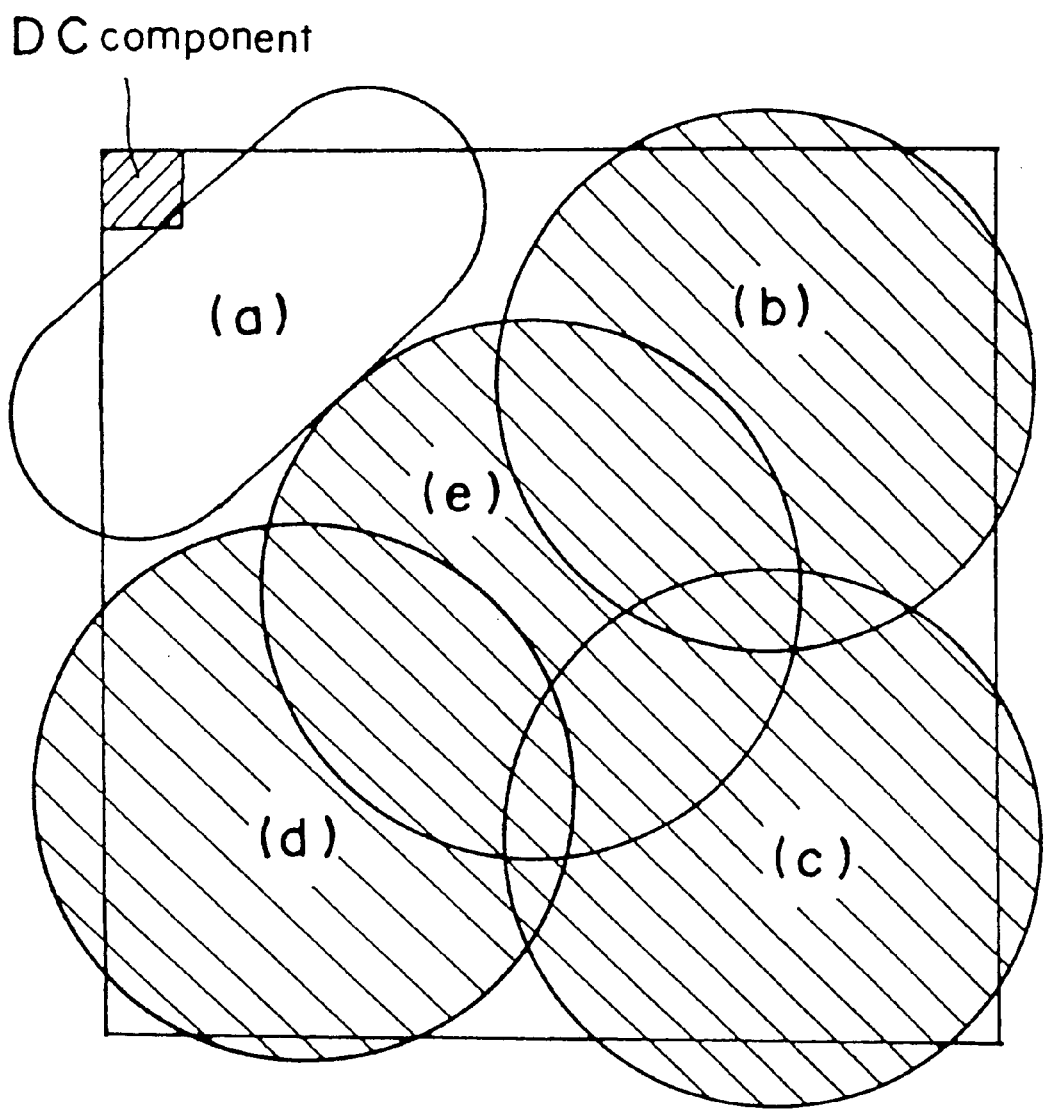
FIG. 7 is a diagram for illustrating areas (a)–(e) used for discriminating a dot image and a character image.
Figure 8:
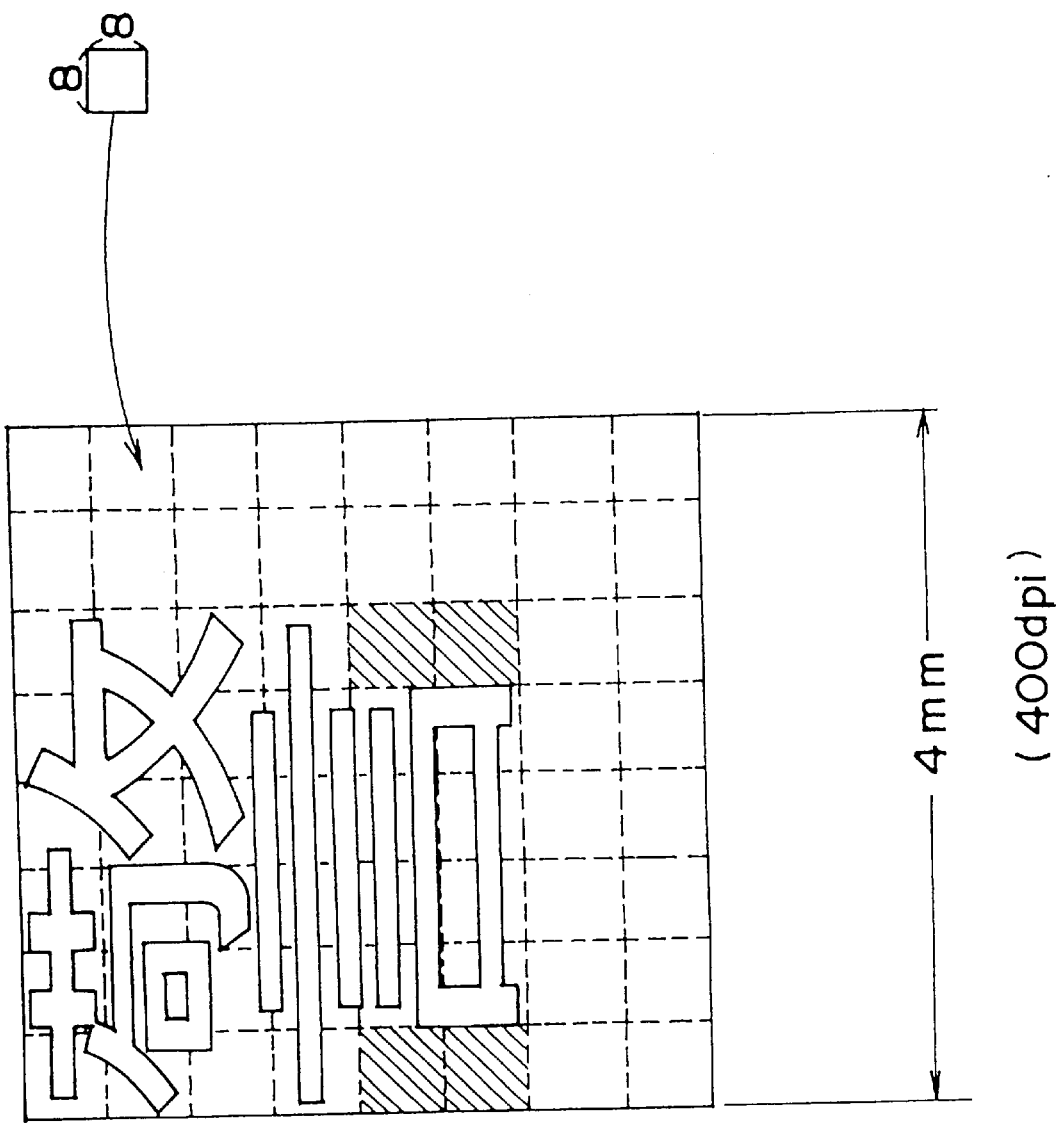
FIG. 8 is a diagram of an example of a chinese character for which a precise discrimination of a character cannot be performed.

Dot image wherein an image is expressed as an assembly of minute dots generally has high AC components after discrete cosine transformation say of an 8*8 pixel matrix in one of areas (b)–(e) shown in FIG. 7. Further, a character image has high AC components in an area (a) of low frequency components adjacent to the DC component, similar to a block shown in FIG. 4. Then, if positions of high AC components are decided, a dot image or a character image can be discriminated. However, there is a possibility of erroneous discrimination because pixels around an 8*8 pixel matrix are not taken into account for discrimination of the kind of an image. FIG. 8 shows an example of such a case wherein an image of a chinese character is illustrated. The character is divided into a plurality of 8*8 pixel matrices. In this image, four hatched matrices are not blocks of character image, and they are quantized with a quantization table provided not for character image. However, it is natural that they are regarded as parts of the character image, but they cannot be decided as a part of the character. Especially, for a character of a reverse image, image distortion is liable to occur at constant density portions around edge portions of a character. Therefore, if blocks at the periphery of a character are compressed with a quantization table for character image, it is expected that image distortion is suppressed. This embodiment solves this problem.

Figure 9:
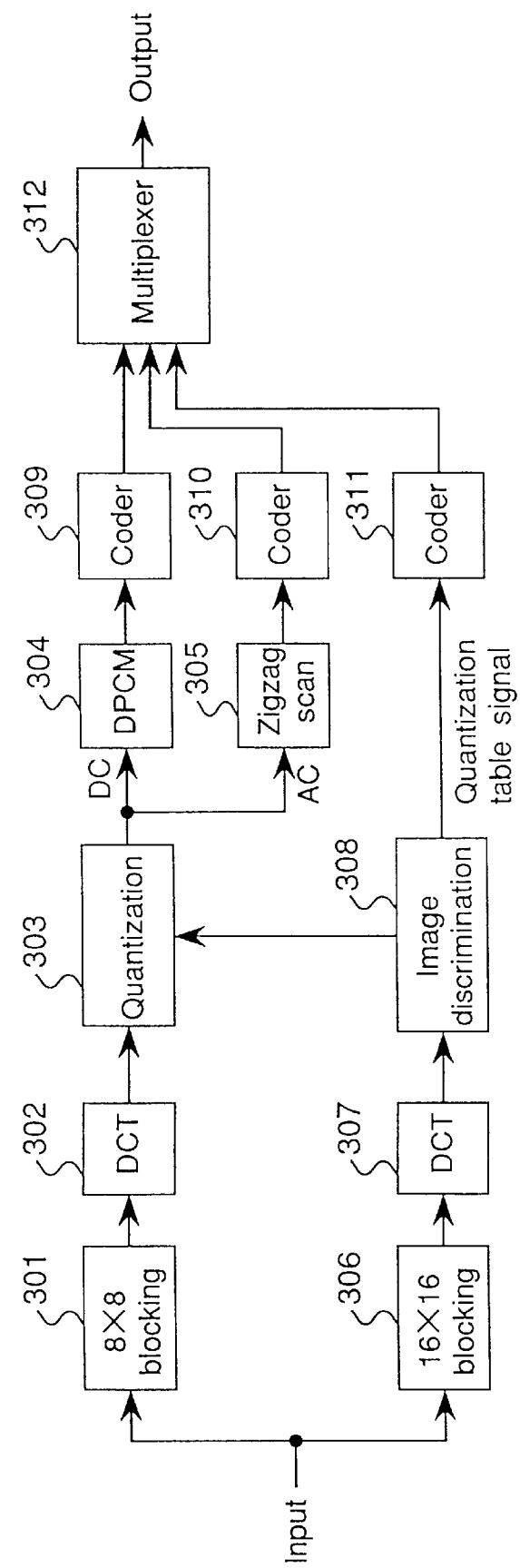
FIG. 9 is a block diagram of a coding section of a second embodiment.

A coding unit 30 of a second embodiment is explained next. FIG. 9 shows a processing block 300 of the coding unit 30. Image data of a document is sent to a 8*8 blocking section 301 and a 16*16 blocking section 306. The 8*8 blocking section 301 are divided into processing pixel matrices of 8*8 pixels. A first DCT (discrete cosine transform) section 302 transforms image data in a processing matrix to DCT coefficients. In the DCT transformation, data $P_{x,y}$ (x, y=0, 1, ..., 7) of pixels in a processing matrix are transformed into 64 DCT coefficients $S_{u,v}$ (u, v=0, 1, ..., 7) according to Eq. (2).

$$S_{u,v} = \frac{1}{4} C_u C_v \sum_{x=0}^{7} \sum_{y=0}^{7} (P_{x,y} - L_s) \text{COS}(2x+1) U \frac{\pi}{16} \cdot \text{COS}(2y+1) v \frac{\pi}{16} \quad (2)$$

wherein x and y denote positions in the processing matrix, u and v denote positions in a matrix of DCT coefficients, $$c_u, c_v = 1/\sqrt{2}, \quad ; u, v = 0$$
$$= 0, \quad ; \text{otherwise}$$

$$L_s = 128, \quad ; 8\text{-bit} P_{x,y}$$
$$= 2048. \quad ; 12\text{-bit} P_{x,y}$$

In the DCT coefficients, coefficient $S_{0,0}$ is called as DC coefficient, and the other 63 coefficients are called as AC coefficients. The DC coefficient means an average of the 8*8 pixels in a processing matrix. If a pixel value $P_{x,y}$ is represented as an 8-bit data, Ls is defined as 128 as an expected value of the DC coefficient is taken as 128. Then, if an average of pixel values is 128, the DC component becomes zero. The first DCT section 302 sends the DCT coefficients to a quantization section 303.

Figure 10:
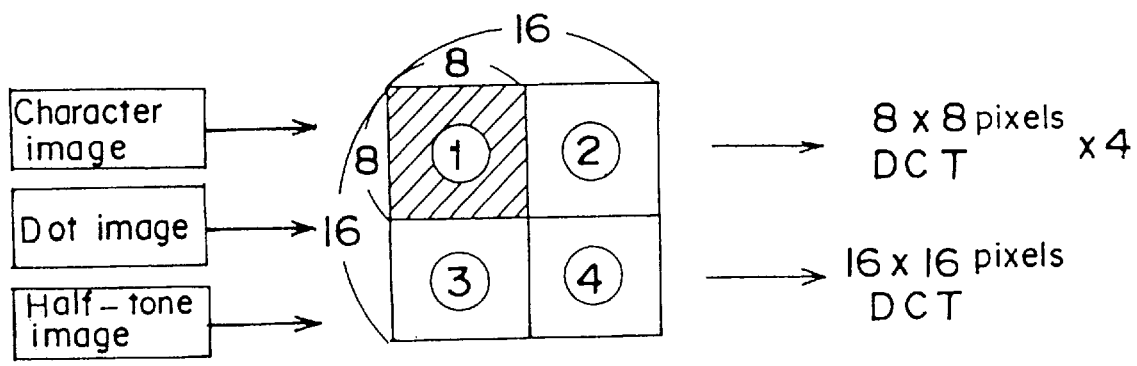
FIG. 10 is a diagram of an example of processing block for discriminating an image in the second embodiment.

The 16*16 blocking section 306 forms 16*16 pixel matrices for discrimination to be sent to a second DCT section 307. As shown in FIG. 10, a 16*16 matrix comprises a first 8*8 pixel matrix at the top and left side on which image data are coded. The 16*16 matrix further comprises a second 8*8 pixel matrix at the left side of the first matrix, a third 8*8 pixel matrix at the bottom and right side thereof and a fourth 8*8 pixel matrix at the bottom side thereof. The second DCT section 307 transforms image data in a 16*16 processing matrix to DCT coefficients and sends them to a image discrimination section 308.

In this embodiment, an image is discriminated on 16*16 DCT coefficients of a 16*16 pixel matrix. By using 16*16 matrix, DCT coefficients of lower frequencies than those of 8*8 matrix can be obtained. As shown in FIG. 7, for a 16*16 matrix of DCT coefficients, a dot image has peaks of AC coefficients in any of four areas (b)–(e) in FIG. 7, while a character image has large AC coefficients in an area (a) including low frequency components. An image which does not have the above-mentioned characteristic is discriminated as a half-tone image. The image discrimination section 308 discriminates a kind of an image in the processing block as described above and sends a result as a discrimination signal to the quantization section 303, which uses it to select a quantization table and to send a quantization table signal to a coder 311. The coder 311 performs coding of the signals and sent the code of quantization table to a multiplexer 312.

On the other hand, the quantization section 303 selects a quantization table according to the discrimination signal received from the image discrimination section 308 and quantizes the DCT coefficients by using the selected quantization table. This means that a kind of image is discriminated by taking into account pixels of 16*16 matrix including the processing block (8*8 matrix) under coding. Then, the DC coefficient ($S_{0,0}$) is sent to a differential pulse-coded modulation (DPCM) section 304 while the AC coefficients are sent to a zigzag scan section 305. The DPCM section 304 calculates a difference between the DC component of the current processing block and that of the previous processing unit, and a coder 309 processes the difference for variable length coding. On the other hand, the zigzag scan section 305 scans the AC components in the order shown in FIG. 5 so as to reorder them in a one-dimensional array. In FIG. 5, the numbers from 1 to 63 shows the order in a matrix of 8*8 for the scan by the zigzag scan section 305. A coder 310 processes the reordered data for entropy coding. A multiplexer 312 multiplexes the data coded by the coders 309, 310, 311 and sends a multiplex data to the facsimile transmission unit 40 or the like.

Figure 11:
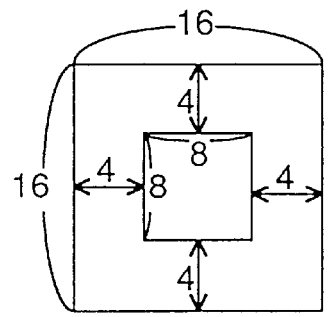
FIG. 11 is a diagram of a second example of processing block for discriminating an image.

A relation of a processing block for coding and a processing block for discrimination of image is not restricted in an example shown in FIG. 10. FIG. 11 shows another example of a processing block of 16*16 pixels for discrimination, wherein a processing block of 8*8 pixels for coding is located at the center of the processing block. Then, the all four sides of the 8*8 processing block at the center is surrounded by adjacent pixels. This example also has an advantage that lower frequency components can be checked.

Figure 12:
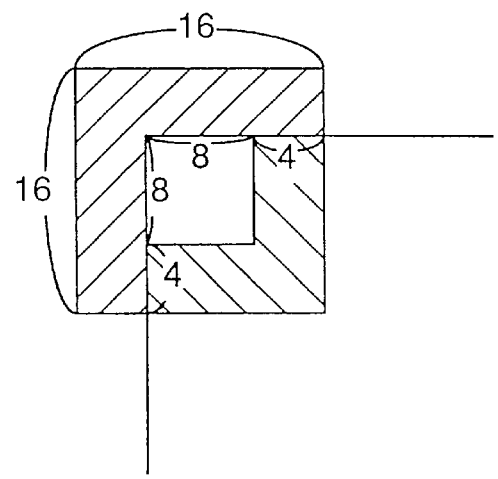
FIG. 12 is a diagram of the second example of processing block at a periphery of an image.

If a processing block for coding is located at a corner of an image, as shown in FIG. 12, a processing block for discrimination does not have image data in a deficient area with hatching at the left and top portions. For example, an average of pixel data in the processing block for discrimination except the processing block for coding is taken as image data in the deficient area. Generally, if a processing block for coding is located at the periphery of an image, such an average is taken as image data in a deficient area.

Figure 13:
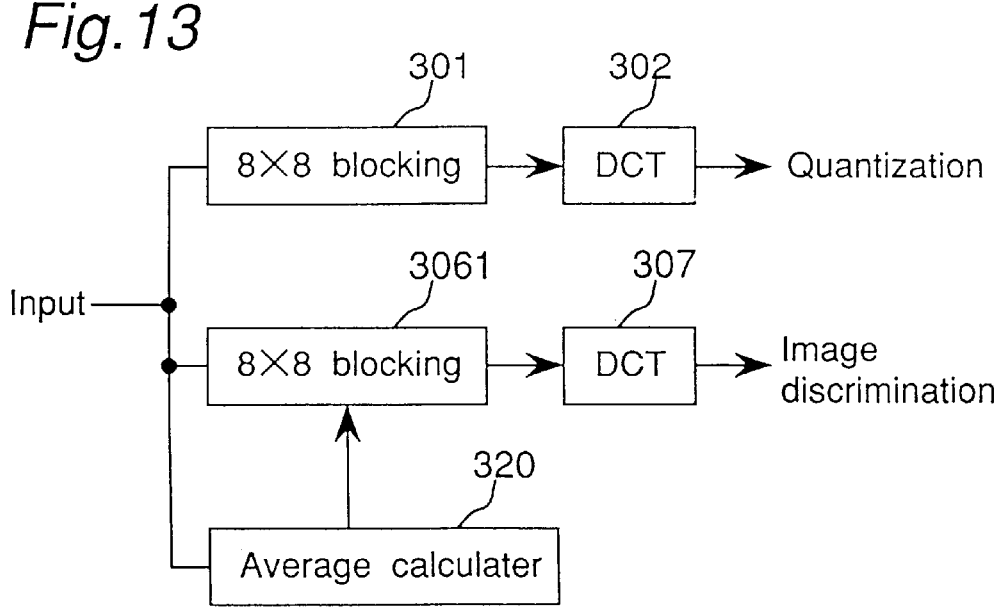
FIG. 13 is a block diagram of a part of a coding section of a modified example of a second embodiment.

FIG. 13 shows a part of a coding unit of the modified example. This unit is different from that shown in FIG. 9 in points that a 16*16 blocking section 306' divides image data into 16*16 pixel matrices at positions different from those of the 16*16 blocking section 306 in FIG. 9 and that an average calculator 320 is provided. If a processing block for coding is located at the periphery of an image, the average calculator 320 calculated an average of pixel data in the processing block for discrimination except the processing block for coding, and it sends the average to the 16*16 blocking section 306'. The processing of pixel data obtained as described above is the same as that of FIG. 9.

To sum up, in the present embodiment, a kind of image can be discriminated by taking into account pixels around a processing block for coding. Thus, a kind of image can be discriminated more correctly. Therefore, a suitable quantization table can be used for quantization.

Next, examples of DCT coefficient data of character, dot and half-tone images for image discrimination are shown in FIGS. 14–17 and 19–22. A color image of R, G and B is converted to Y, U and V components, and Y data are subjected to DCT operation. For an example of a character image, FIG. 14 shows an example of DCT coefficients data of four adjacent 8*8 matrices denotes as (1)–(4) in correspondence to FIG. 10, while FIG. 15 shows an example of DCT coefficients data of the 16*16 matrix including the four matrices.

Figure 18:
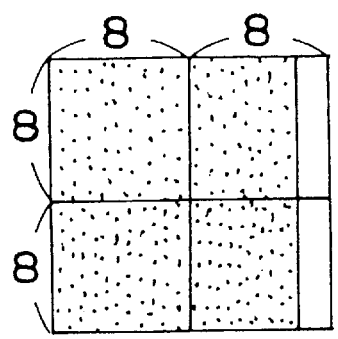
FIG. 18 is a diagram of a second example of a dot image.
Figure 17:
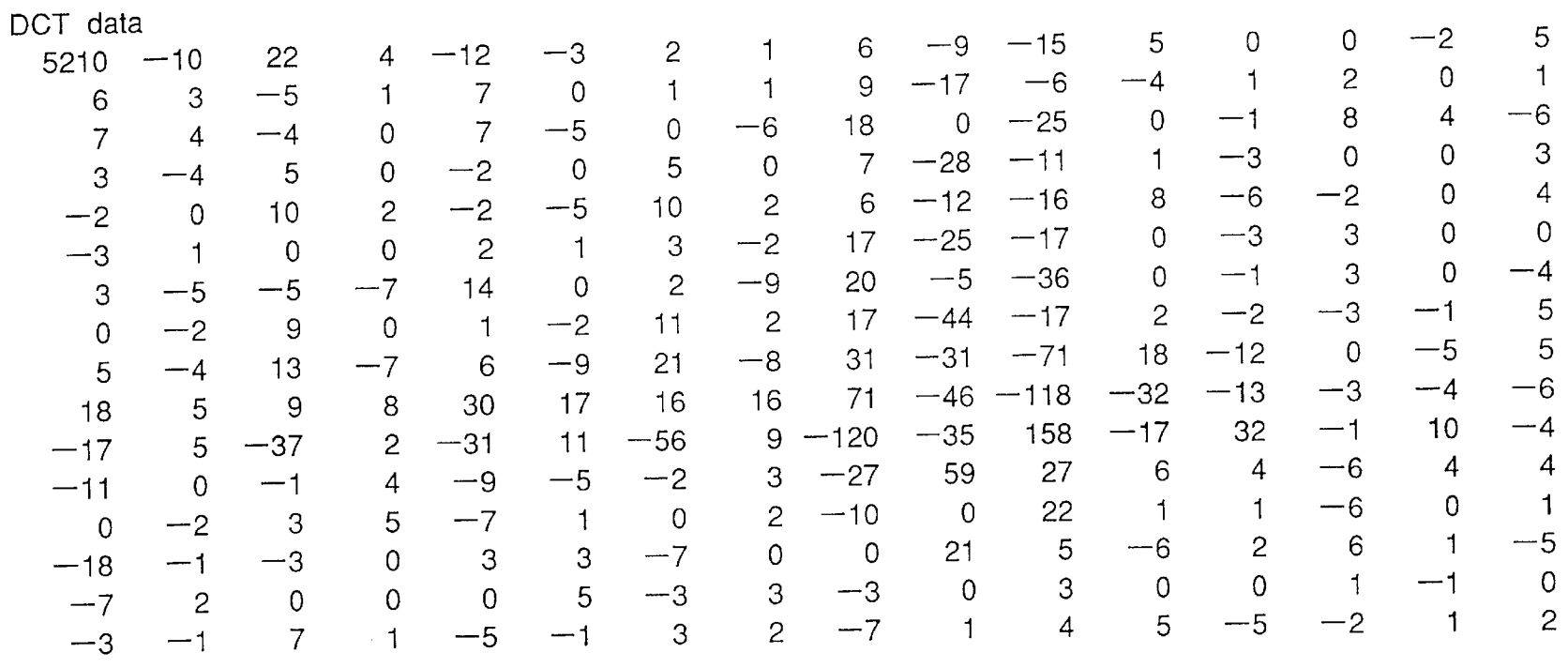

For an example of a dot image, FIG. 16 shows an example of four DCT coefficients data of four adjacent 8*8 matrices, while FIG. 17 shows an example of DCT coefficients data of the 16*16 matrix including the four matrices. The DCT coefficients of the four 8*8 matrices shown in FIG. 17 can be discriminated to be a dot image. However, DCT coefficient data of the 16*16 matrix of FIG. 16 can be discriminated more easily to be a dot image because they include more frequency components not included in the 8*8 matrix. Another example of a dot image shown in FIG. 18 includes second and fourth 8*8 blocks with white portions at the right side thereof. FIG. 19 shows an example of four DCT coefficients data of four adjacent 8*8 matrices, while FIG. 20 shows an example of DCT coefficients data of the 16*16 matrix including the four matrices. In this case, the second and fourth processing blocks are decided to be not a dot image, but a character image. On the other hand, 16*16 processing block is decided to be a dot image. For an example of a half-tone image (photograph), FIG. 21 shows an example of four DCT coefficients data of four adjacent 8*8 matrices, while FIG. 22 shows an example of DCT coefficients data of the 16*16 matrix including the four matrices.

Figure 23:
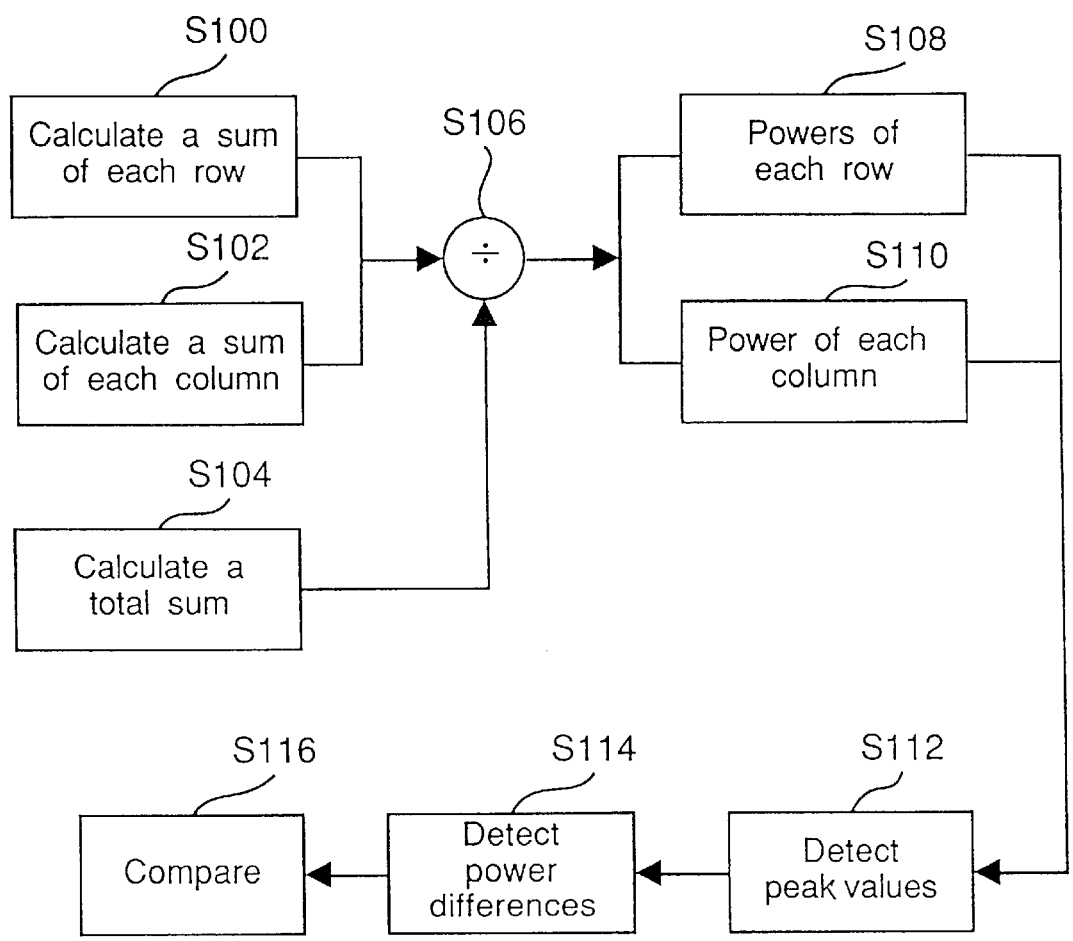
FIG. 23 is a flow of a discrimination of image by the image discrimination section.
Figure 24:
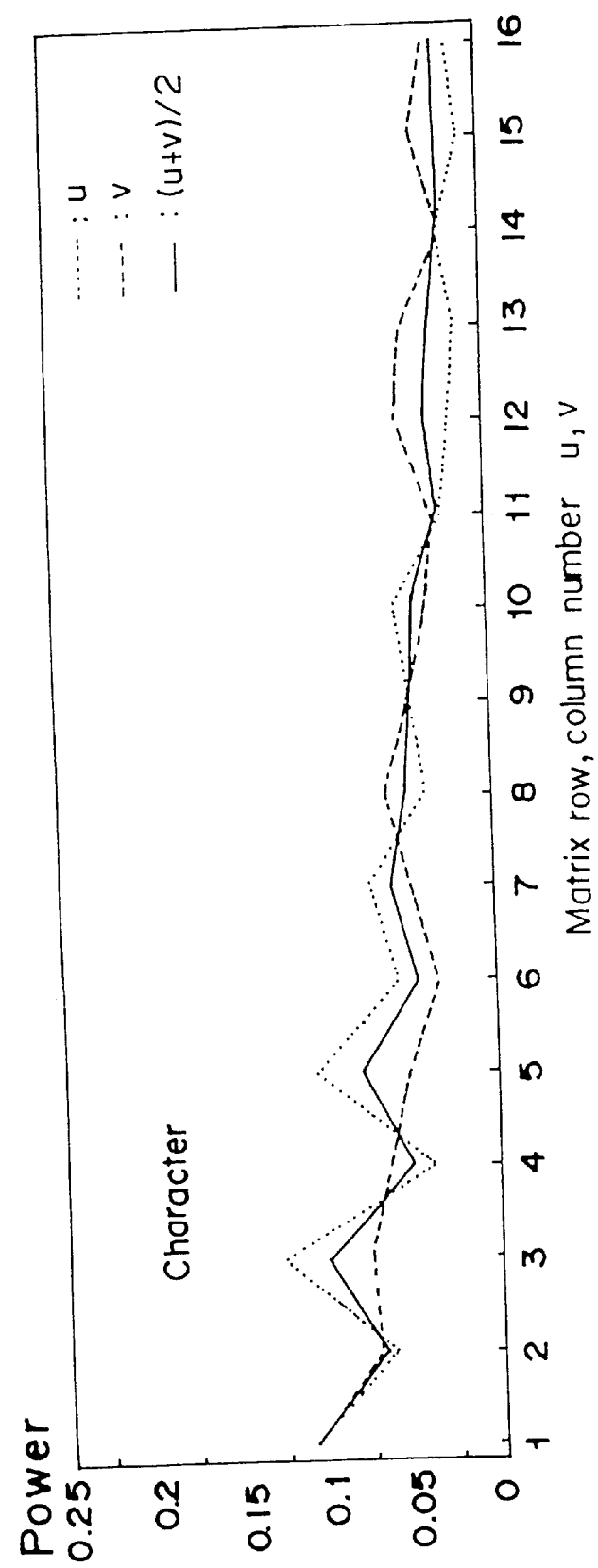
FIG. 24 is a graph of power of a character image obtained from the data of FIG. 15.
Figure 25:
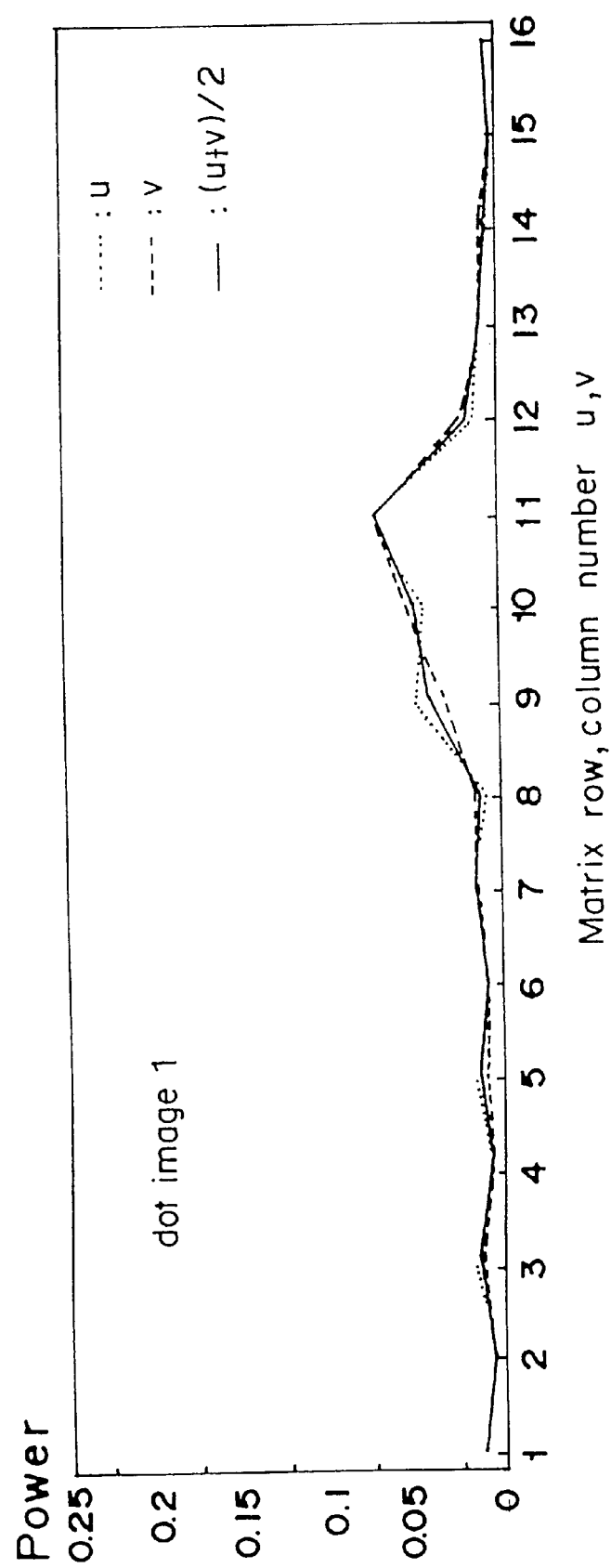
FIG. 25 is a graph of power of a dot image obtained from the data of FIG. 17.
Figure 26:
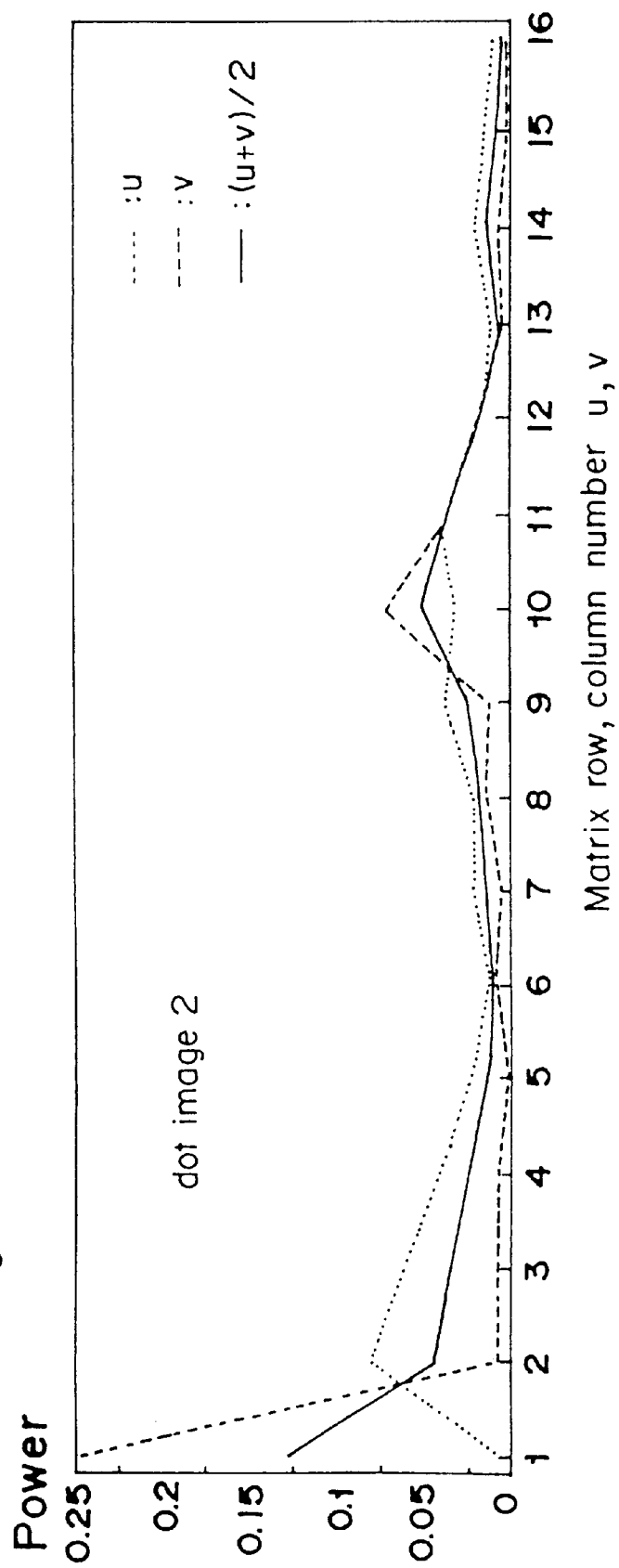
FIG. 26 is a graph of power of another dot image obtained from the data of FIG. 20.
Figure 27:
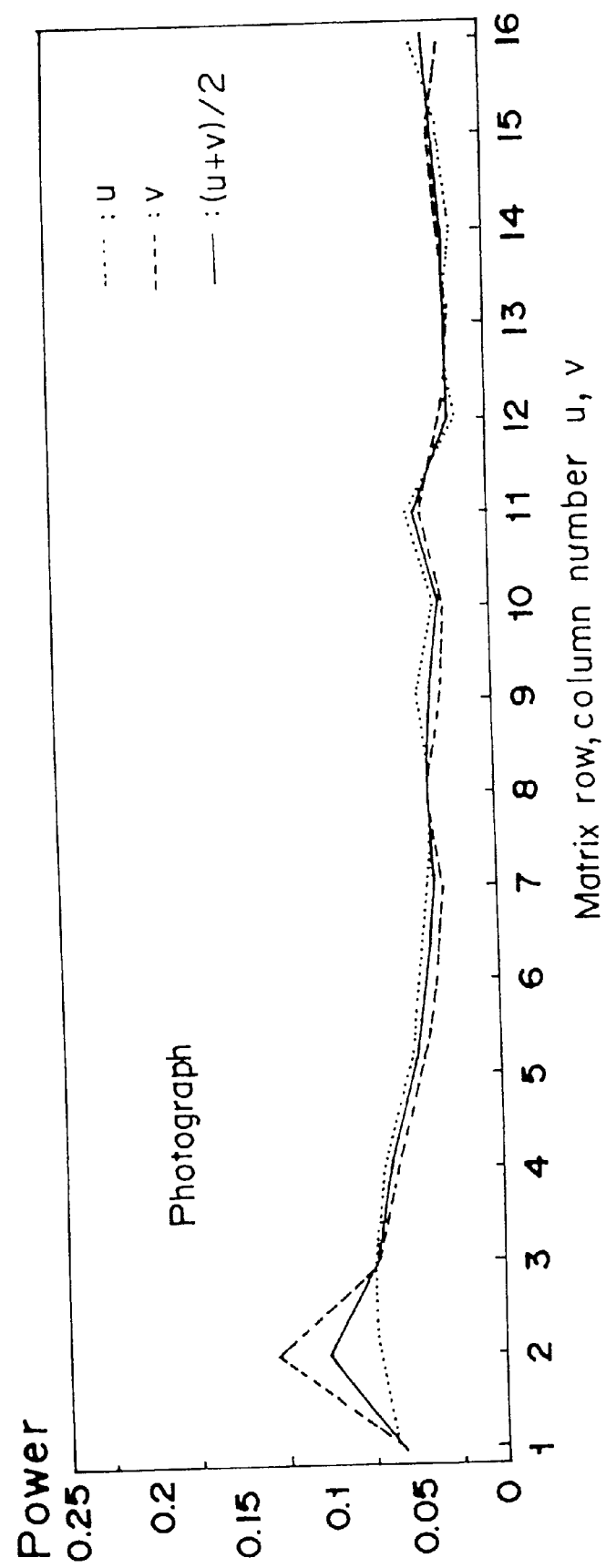
FIG. 27 is a graph of power of a character image obtained from the data of FIG. 22.

Next, a discrimination of image by the image discrimination section 308 is explained with reference to FIG. 23. On a 16*16 matrix of DCT coefficients, a sum of DCT components in each row except the DC component is calculated (step S100), while a sum of DCT components in each column except the DC component is also calculated (step S102). On the other hand, a sum of all the DCT components including the DC component is also calculated (step S104). Then, these sums are divided with the total sum (step S106), so that powers of each row and of each column are obtained (steps S108 and S110). Then, peaks are detected in the powers for discriminating a dot image (step S112). If peaks are relatively small at low frequencies in a region (a) in correspondence to FIG. 7 and peaks appear at high frequencies in areas (b)–(e) in FIG. 7, it is discriminated to be a dot image. For an image other than a dot image, differences of powers between row and column are calculated (step S114) and they are compared for image discrimination of character image and half-tone image (step S116). If differences of powers between row and column of the same number is large, it is discriminated as a character image, otherwise it is discriminated as a half-tone image.

FIGS. 24–27 show graphs of powers calculated from the data of FIG. 15, 17, 20 and 22. It is found that the data shown in FIGS. 24–27 can be discriminated as a character image, a dot image, a dot image and a half-tone image as expected. It is to be noted that an image of FIG. 18 in correspondence to the data of FIG. 20 has clear high peaks at high frequencies and it can be discriminated as a dot image.

Third Embodiment

Figure 28:
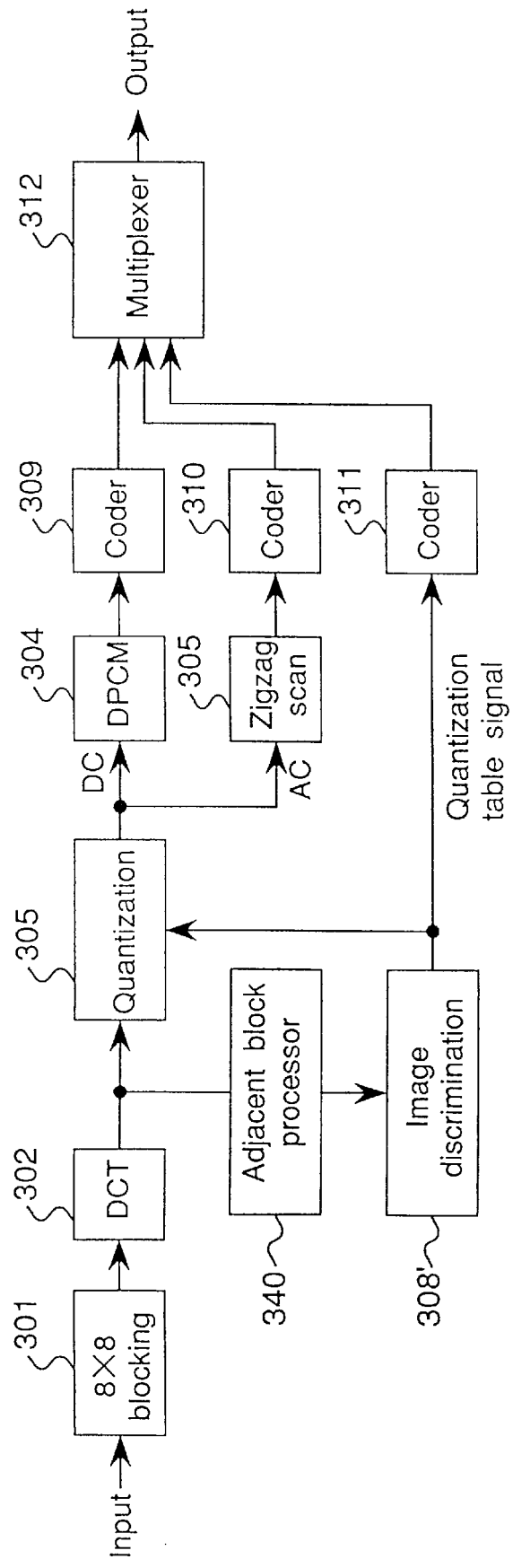
FIG. 28 is a block diagram of a coding section of a still modified example of a third embodiment.

FIG. 28 shows a processing block 600 of the coding unit 30 of a third embodiment. The processing block 600 is different from that of the second embodiment shown in FIG. 9 in a point that an adjacent block processing unit 340 is used instead of the 16*16 blocking section 306 and the second DCT section 307. In other word, 16*16 blocking is not needed for image discrimination in the third embodiment.

Image data of a document is sent to a 8*8 blocking section 301, which divides image data into processing pixel matrices of 8*8 pixels. A DCT (discrete cosine transform) section 302 transforms image data in a processing matrix to DCT coefficients. In the DCT transformation, data $P_{x,y}$ (x, y=0, 1, . . . , 7) of pixels in a processing matrix are transformed into 64 DCT coefficients $S_{u,v}$ (u, v=0, 1, . . . , 7) according to Eq. (1) described above. The DCT section 302 sends the DCT coefficients to a quantization section 303 and to the adjacent block processing unit 340.

Figure 29:
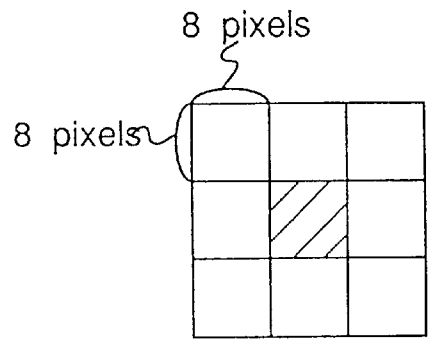
FIG. 29 is a diagram of an example of processing block for discriminating an image of a third embodiment.

The adjacent block processing unit 340 performs an average of DCT coefficients for each component as will be explained later and sends the averages to an image discrimination section 308. FIG. 29 shows an example of a processing block of discrimination. In this example, a processing block for coding (shown with hatching in FIG. 29) is located at a center of eight 8*8 pixel matrices. In other words, a processing block for discrimination is a 24*24 pixel matrix. Thus, data of eight adjacent blocks are taken into image discrimination.

The image discrimination section 308 discriminates a kind of an image in the processing block according to the averages as described in the second Embodiment and sends a result as a discrimination signal to the quantization section 303, which uses it to select a quantization table and to send a quantization table signal to a coder 311. The coder 311 performs coding of the signals and sent the code of quantization table to a multiplexer 312.

Then, the DC coefficient ($S_{0,0}$) is sent to a differential pulse-coded modulation (DPCM) section 304 while the AC coefficients are sent to a zigzag scan section 305. The DPCM section 304 calculates a difference between the DC component of the current processing block and that of the previous processing unit, and a coder 309 processes the difference for variable length coding. On the other hand, the zigzag scan section 305 scans the AC components in the order shown in FIG. 5. A coder 310 processes the reordered data for entropy coding. A multiplexer 312 multiplexes the data coded by the coders 309, 310, 311 and sends a multiplex data to the facsimile transmission unit 40 or the like.

Figure 30:
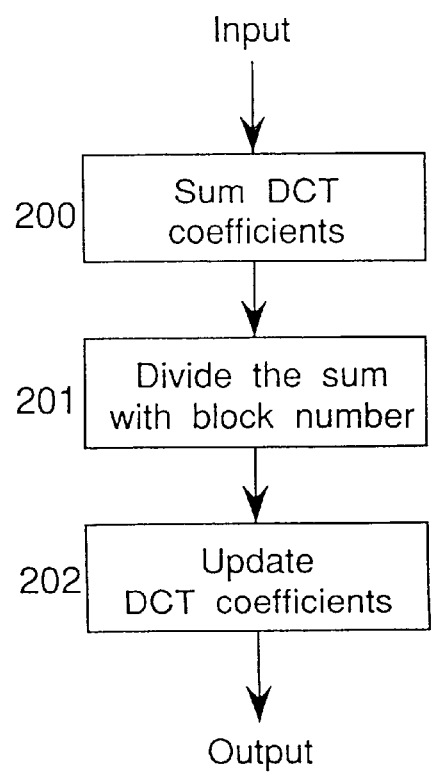
FIG. 30 is a flowchart of discrimination of image.
Figure 31C:
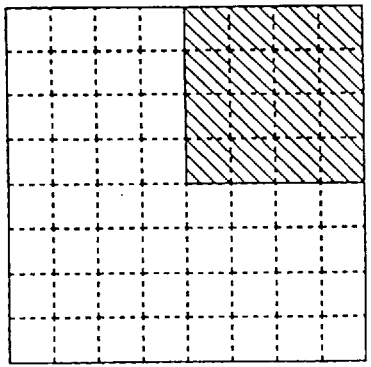
FIG. 31A–31E are diagrams of prior art discrimination windows.
Figure 31B:
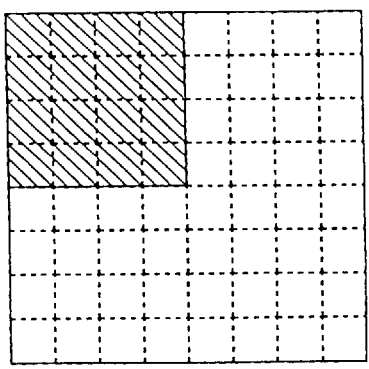
Figure 31E:
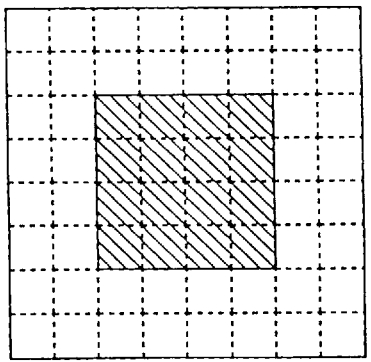
Figure 31A:
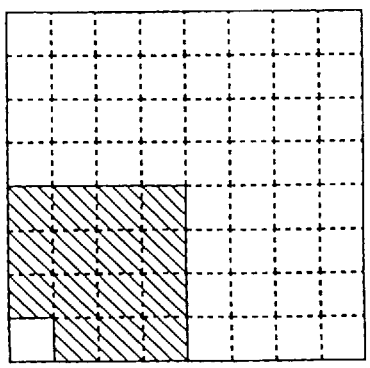
Figure 31D:
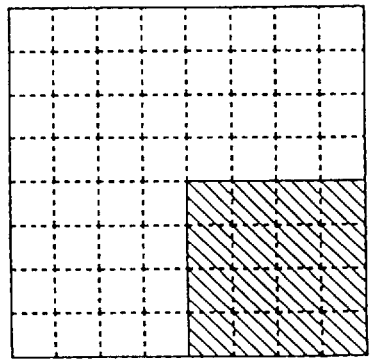

FIG. 30 shows a flowchart of the processing performed by the adjacent block processing unit 340. First, the adjacent block processing unit 340 receives DCT coefficients for the nine 8*8 pixel blocks including a processing block for coding at the center thereof and calculates a sum of the DCT coefficients for each component (step S200). For example, a sum of DC coefficients $S_{0,0}$ of the blocks is calculated. Next, each sum is divided with a number of blocks or nine (step S201). Then, an average of the DCT coefficients is supplied to the image discrimination section 308' as DCT coefficients of a processing block for coding. Therefore, a kind of an image can be discriminated by taking adjacent processing blocks into account.

In the present embodiment, a kind of image can be discriminated by taking into account pixels around a processing block for coding as a kind of averages. Thus, a kind of image can be discriminated more correctly. Therefore, a suitable quantization table can be used for quantization.

Though a processing block of nine 8*8 matrices is used in the present embodiment, a processing block is not limited to that shown in FIG. 29. Though the adjacent block processing unit 340 performs simple average operation, it may perform average operation with appropriate weights.

Fourth Embodiment

Prior art discrimination windows as shown in FIGS. 31A–31E are used to discriminate a dot image. A dot image has generally a peak of AC coefficients in the windows shown in FIG. 31B–31E and has relatively small absolute values in the window shown in FIG. 31A. Then, an image can be discriminated as a dot image if a sum of absolute values of DCT coefficients in the window shown in FIG. 31B–31E is larger than the counterpart in the window shown in FIG. 31A and larger than a prescribed threshold value. However, it is a problem that the window of FIG. 31E overlaps the windows of FIG. 31A–31D. Then, an erroneous discrimination is liable to occur when large peaks appear in the window shown in FIG. 31A because it is not certain which of windows of FIG. 31A and FIG. 31E has a larger sum. Then, it is preferable not to use overlapped windows for discrimination. Further, it is not preferable to calculate a sum for images such as a dot image having clear peaks, but an erroneous discrimination is not liable to occur if a maximum value is used for comparison instead of a sum. A dot image can be discriminated correctly and simply by using a discrimination method of this embodiment.

Figure 32:
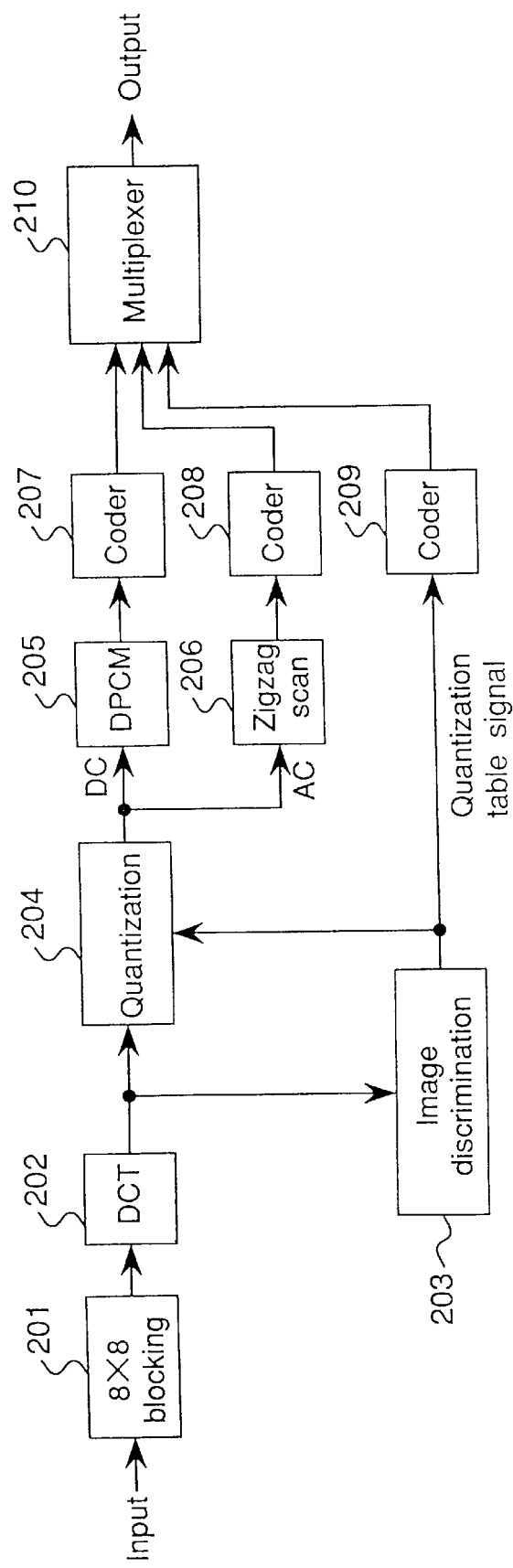
FIG. 32 is a block diagram of a coding section of a still modified example of a third embodiment.

FIG. 32 shows a processing block 200 of the coding unit 30 of a fourth embodiment. Image data of a document is received by a 8*8 blocking section 201, and the 8*8 blocking section 201 divides the image data into processing pixel matrices of 8*8 pixels. A DCT (discrete cosine transform) section 202 transforms image data in a processing matrix to DCT coefficients. The DCT section 202 sends the DCT coefficients to an image discrimination section 203 and a quantization section 204. The image discrimination section 203 discriminates a kind of an image in the processing block as will be explained later. Then, it sends a discrimination signal to the quantization section 204 which uses it to select a quantization table. It also sends a quantization table signal to a coder 209. The coder 209 performs coding of the signal and sent the code of quantization table to a multiplexer 210. On the other hand, the quantization section 204 selects a quantization table according to the discrimination signal and quantizes the DCT coefficients by using the selected quantization signal. Then, the DC coefficient is sent to a differential pulse-coded modulation (DPCM) section 205 while the AC coefficients are sent to a zigzag scan section 206. The DPCM section 205 calculates a difference between the DC component of the current processing block and that of the previous processing unit, and a coder 207 processes the difference for variable length coding. On the other hand, the zigzag scan section 206 scans the AC components in the order shown in FIG. 5 so as to reorder them in a one-dimensional array. A coder 208 processes the reordered data for entropy coding. A multiplexer 210 multiplexes the data coded by the coders 207, 208, 209 and sends a multiplex data to the facsimile transmission unit 40 or the like.

Figure 33B:
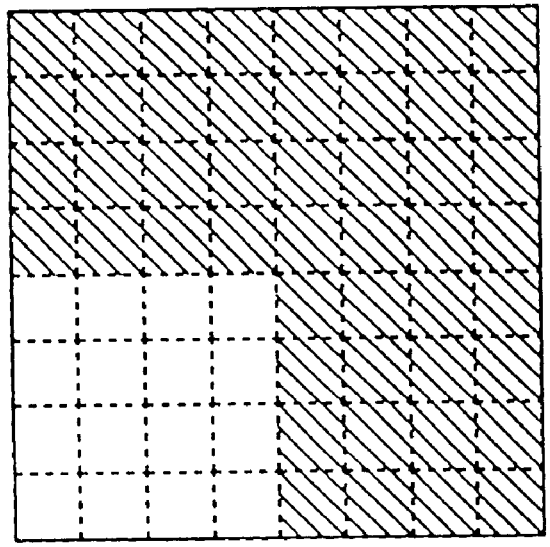
FIG. 33A and 33B are diagrams of two windows for image discrimination.
Figure 33A:
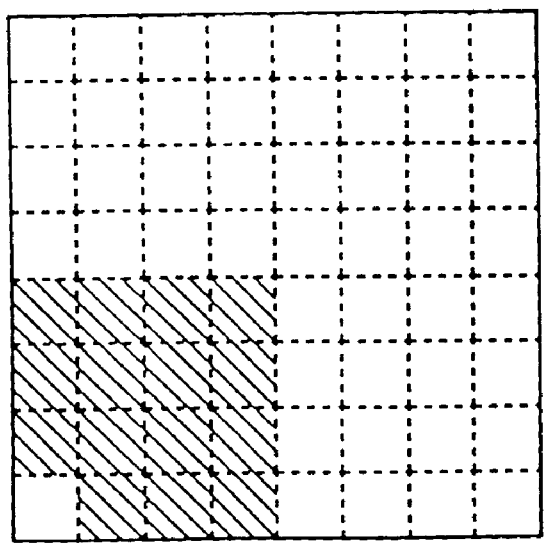

The image discrimination section 203 calculated a maximum of DCT coefficients in two regions shown in FIGS. 33A and 33B. The first region shown in FIG. 33A consists of four rows and four columns at low frequency components except the DC component, while the second region shown in FIG. 33B consists of the other components. Then, an image is discriminated by using the two maxima.

Figure 34:
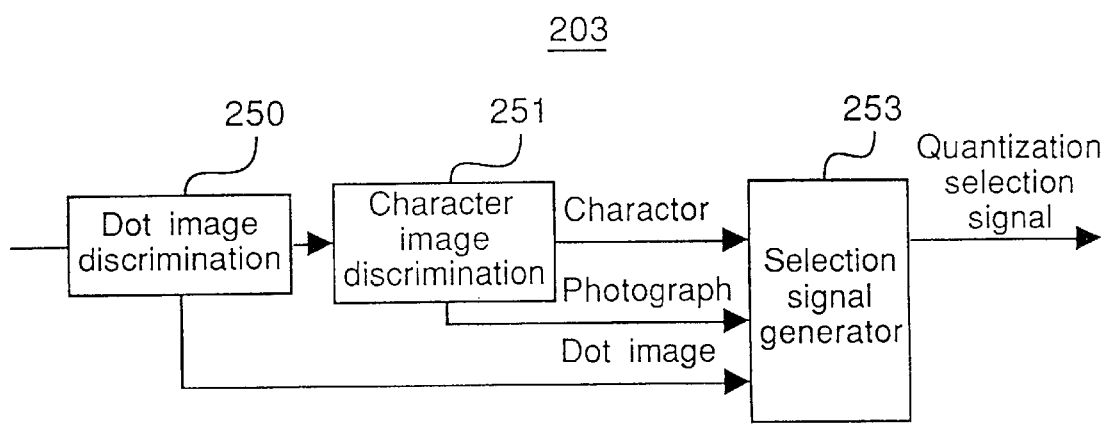
FIG. 34 is a block diagram of a coding section of FIG. 31.

FIG. 34 shows a block diagram of the image discrimination section 203, wherein a dot image discrimination section 250 receives DCT coefficients of a processing block of an image. Then, it sends a high level signal to a selection signal generator 252 if the image is discriminated as a dot image, as will be explained later. The DCT coefficients data are sent next to a character image discrimination section 251. It sends a high or low level signal to the selection signal generator 252 according as the image is discriminated as a character image or a photograph image. The selection signal generator 252 generates a selection signal according to received three signals. For example, the selection signal is "10", "01" or "00" according as the image is a dot image, a character image or a half-tone image.

Figure 35:
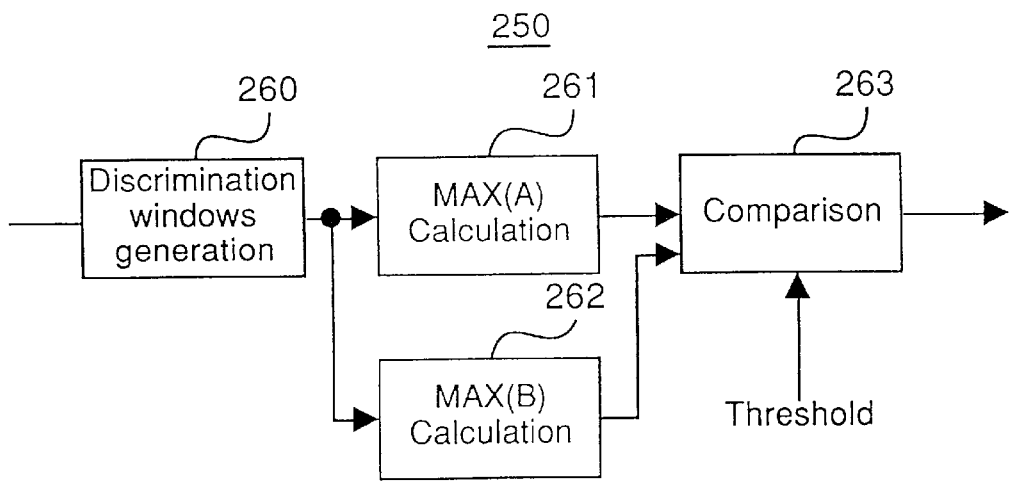
FIG. 35 is a block diagram of a dot image discrimination section.

Next, FIG. 35 shows the dot image discrimination section 250. A discrimination windows generation section 260 generates two windows shown in FIGS. 33A and 33B. A first window shown in FIG. 33A comprises AC DCT components around the DC coefficient, while a second window shown in FIG. 33B comprises AC DCT coefficients except those included in the first window. That is, the two windows do not have common DCT coefficients. In concrete, the discrimination windows generation section 260 separates the DCT coefficients in a processing block in the two areas shown in FIGS. 33A and 33B and supplies them to a MAX(A) calculation section 261 and a MAX(B) calculation section 262, respectively. The MAX(A) calculation section 261 calculates a maximum of absolute values (or a first peak) of the DCT coefficients in the first window, while a MAX(B) calculation section 262 calculates a maximum of absolute values (or a second peak) of the DCT coefficients in the second window. The two peak values are sent to a comparator 263. The comparator compares the first peak with the second peak, and it also compares the second peak value with a threshold value determined according to experimental data. If the second peak value is larger than the first peak value and larger than the threshold value, the image in the processing block is determined as an dot image. Otherwise the image is determined as a character or half-tone image.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A dot image discrimination device comprising:
   an orthogonal transform device for performing orthogonal transformation of image data in a processing block to send coefficient data;
   a first detection device for detecting a maximum of absolute values in a first discrimination region of the coefficient data comprising AC coefficients around a DC coefficient in the coefficient data;
   a second detection device for detecting a maximum of absolute values of digital cosine transform coefficients in a second discrimination region which does not belong to the first discrimination region;
   a discrimination device for discriminating that an image in the processing block is a dot image if an output value of said second detection device is larger that of said first detection device and is larger than a predetermined threshold value.

2. The device according to claim 1, wherein the first discrimination region is one of four equivalent regions obtained by dividing the digital cosine transform coefficient data obtained by the digital cosine transform of the processing block, which first discrimination region being one of the four regions including a DC coefficient, but not including the DC coefficient.

* * * * *